US012657420B2

(12) United States Patent
Peraire-Bueno et al.

(10) Patent No.: US 12,657,420 B2
(45) Date of Patent: Jun. 16, 2026

(54) SYSTEMS AND METHODS FOR RELATIVE DAMPING OF ANTENNAS FOR SENSING AND TUNING IN THE FREQUENCY DOMAIN

(71) Applicant: Massachusetts Institute of Technology, Cambridge, MA (US)

(72) Inventors: Alexander I. Peraire-Bueno, Cambridge, MA (US); Anastasios John Hart, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 58 days.

(21) Appl. No.: 18/861,233

(22) PCT Filed: May 1, 2023

(86) PCT No.: PCT/US2023/020573
§ 371 (c)(1),
(2) Date: Oct. 29, 2024

(87) PCT Pub. No.: WO2024/005909
PCT Pub. Date: Jan. 4, 2024

(65) Prior Publication Data
US 2025/0292053 A1 Sep. 18, 2025

Related U.S. Application Data

(60) Provisional application No. 63/356,997, filed on Jun. 29, 2022.

(51) Int. Cl.
*H04B 3/36* (2006.01)
*G06K 19/07* (2006.01)
*G06K 19/077* (2006.01)

(52) U.S. Cl.
CPC ..... *G06K 19/0717* (2013.01); *G06K 19/0726* (2013.01); *G06K 19/07775* (2013.01); *G06K 19/07786* (2013.01)

(58) Field of Classification Search
CPC ........... G06K 19/0717; G06K 19/0726; G06K 19/07775; G06K 19/07786; G01N 33/0073
See application file for complete search history.

(56) References Cited

U.S. PATENT DOCUMENTS 7,911,345 B2 * 3/2011 Potyrailo ........... G06K 19/0716
340/10.5
2009/0278685 A1 11/2009 Potyrailo et al.
(Continued)

OTHER PUBLICATIONS

PCT International Search Report and Written Opinion completed by the ISA/US on Jun. 27, 2023 and issued in connection with PCT/US2023/020573.
(Continued)

*Primary Examiner* — Toan N Pham
(74) *Attorney, Agent, or Firm* — Barnes & Thornburg LLP

(57) ABSTRACT

Radio Frequency Identification (RFID) tags having functionalized carbon nanotubes (CNTs) engineered to change in resistance when exposed to a variety of analytes to provide an inexpensive framework for distributed sensing. For example, a printing process can be developed for liquid inks comprising CNTs, and RFID sensors can be fabricated with functionalized CNTs as the active elements. The tags can work independent of distance and can sense changes in resistance of a sensing element. The tags can include an antenna with an inductive loop and two sets of dipole arms having functionalized carbon nanotubes, and a RFID chip that separates the two sets of dipole arms. The dipole arms can capture an analyte on a plurality of sensors and generate (Continued)

a plurality of resonant peaks therefrom. The peaks can be analyzed by comparing the damping therebetween, or by shifting the resonant frequency of the tag to determine presence of the analyte.

21 Claims, 16 Drawing Sheets

(56)                    References Cited

U.S. PATENT DOCUMENTS

| | | |
|---|---|---|
| 2012/0116683 A1 | 5/2012 | Potyrailo et al. |
| 2013/0099897 A1 | 4/2013 | Forster |
| 2015/0247832 A1 | 9/2015 | Swager et al. |
| 2022/0057352 A1 | 2/2022 | Swager et al. |
| 2022/0237393 A1* | 7/2022 | Chung ............... G06K 19/0723 |
| 2024/0178568 A1* | 5/2024 | Rokhsaz ................. H01Q 1/38 |

OTHER PUBLICATIONS

Vena, et al., "Toward a reliable chipless RFID humidity sensor tag based on silicon nanowires." IEEE Transactions on Microwave Theory and Techniques 64.9 (2016): 2977-2985.

R. A. Potyrailo, C. Surman, N. Nagraj, and A. Burns, "Materials and transducers toward selective wireless gas sensing," ACS Publications, vol. 111, No. 11, 2011.

A. Dada and F. Thiesse, "Sensor applications in the supply chain: The example of quality-based issuing of perishables," in The Internet of Things, C. Floerkemeier, M. Langheinrich, E. Fleisch, F. Mattern, and S. E. Sarma, Eds. Berlin, Heidelberg: Springer Berlin Heidelberg, 2008, pp. 140-154.

R. Tang, Y. Shit, Z. Hou, and L. Wei, Carbon nanotube-based chemiresistive sensors, Sensors, vol. 17, No. 4, 2017.

H. Bai and G. Shi, "Gas sensors based on conducting polymers," Sensors (Basel), 2007.

S. Dehghani and M. K. Moravvvej-Farshi, "Temperature dependence of electrical resis- tance of individual carbon nanotubes and carbon nanotubes network," Modern Physics Letters B, vol. 26, 2012.

R. Bhattacharyya, C. Floerkemeier, and S. Sarma, "Low-cost, ubiquitous rfid-tag- antenna-based sensing," Proceedings of the IEEE, vol. 98, 2010.

G. Swamy and S. Sarma, "Manufacturing cost simulations for low cost rfid systems," Massachusetts Institute of Technology Auto-ID Center, 2003.

M. Bhattacharya, C.-H. Chu, and T. Mullen, "A comparative analysis of rfid adoption in retail and manufacturing sectors," IEEE International Conference on RFID, 2009.

L. Yang, R. Zhang, D. Staiculescu, C. Wong, and M. M. Tentzeris, "A novel conformal rfid-enabled module utilizing inkjet-printed antennas and carbon nanotubes for gas- detection applications," IEEE Antennas and Wireless Propagation Letters, vol. 8, 2009.

C. Occhiuzzi, A.Rida, G. Marrocco, and M. M. Tentzeris, "Passive ammonia sensor: Rfid tag integrating carbon nanotubes," IEEE International Symposium on Antennas and Propagation, 2011.

J. M. Azzarelli, K. A. Mirica, J. B. Ravnsbæk, and T. M. Swager, "Wireless gas detection with a smartphone via rf communication," PNAS, vol. 111, 2014.

P. Sen, S. N. R. Kantareddy, R. Bhattacharyya, S. E. Sarma, and J. E. Siegel, "Low-cost diaper wetness detection using hydrogel-based rfid tags," IEEE Sensors Journal, 2019.

A. A. Kutty, L. S. Toni Bjornine and, and L. Ukkonen, "A novel carbon nanotube loaded passive uhf rfid sensor tag with built-in reference for wireless gas sensing," IEEE Microwave, MTT-S International Symposium, 2016.

K. V. S. Rao, P. V. Nikitin, and S. F. Lamen, "Impedance matching concepts in rfid transponder design," Fourth IEEE Workshop on Automatic Identification Advanced Technologies, 2005.

Impinj, "Rfid tag antenna design, design overview and guidelines," 2017.

Liu, Sophie F., et al. "Single-walled carbon nanotube/metalloporphyrin composites for the chemiresistive detection of amines and meat spoilage." Angewandte Chemie International Edition 54.22 (2015): 6554-6557.

N. A. Mohammed, K. R. Demarest, and D. D. Deavours, "Analysis and synthesis of uhf rfid antennas using the embedded t-match," IEEE International Conference on RFID, 2010.

K. Finkenzeller, RFID Handbook: Fundamentals and Applications in Contactless Smart Cards and Identification, 2nd ed. New York: John Wiley and Sons Ltd, 2003.

R. P. Tortorich and J.-W. Choi, "Inkjet printing of carbon nanotubes," Nanomaterials, 2013.

A. Kolsrud, M.-Y. Li, and K. Chang, "Frequency tunable cpw-fed cps dipole antenna using varactors," IEEE Antennas and Propagation Society International Symposium, 1998.

L. Vaisman, H. D. Wagner, and G. Marom, "The role of surfactants in dispersion of carbon nanotubes," Advances in Colloid and Interface Science, 2006.

F. Sabri, M. Zakaria, and H. Akil, "Dispersion and stability of multiwalled carbon nanotubes (mwcnts) in different solvents," AIP Conference Proceedings 2267, 2020.

C. Mackin, V. Schroeder, A. Zurutuza, C. Su, J. Kong, T. M. Swager, and T. Palacios, "Chemiresistive graphene sensors for ammonia detection," Applied Materials and Interfaces, 2018.

* cited by examiner

SYSTEMS AND METHODS FOR RELATIVE DAMPING OF ANTENNAS FOR SENSING AND TUNING IN THE FREQUENCY DOMAIN

CROSS REFERENCE TO RELATED APPLICATION

This application is a U.S. national counterpart application of International Application Serial No. PCT/US2023/020573, entitled "SYSTEMS AND METHODS FOR RELATIVE DAMPING OF ANTENNAS FOR SENSING AND TUNING IN THE FREQUENCY DOMAIN," filed Jun. 29, 2022, which claims priority to and the benefit of U.S. Provisional Application No. 63/356,997, entitled "Relative Damping of Parallel Antennas for Sensing and Tuning," filed on Jun. 29, 2022, the content of each of which is incorporated by reference herein in its entirety.

GOVERNMENT RIGHTS

This invention was made with government support under FA8702-15-D-0001 awarded by the United States Air Force. The government has certain rights in the invention.

FIELD

The present disclosure relates to sensors for detection of environmental changes and/or chemicals, and more particularly relates to a radio frequency identification (RFID) tag having an antenna for sensing changes in resistance of a sensing element in the frequency domain independent of a distance between the tag and a reader.

BACKGROUND

Ultra High Frequency (UHF) Radio Frequency Identification (RFID) tags provide an inexpensive framework for ubiquitous, distributed sensing of chemical and environmental factors. Sensing of these factors provides high-value information that is useful for dynamic and data-driven decision-making both locally and across large numbers of sensors. For instance, the detection of volatile organic compounds (VOCs) that pose risks to public health or the condition of perishable goods, which are estimated to cause 30% losses in the US supply chain, can benefit from such gathering of information. The value of obtaining information about these chemical and environmental factors has increased demand for cost-effective and mass-produced sensors that can detect specific chemical compounds, temperature changes, or other stimuli of interest.

Various materials, such as pristine and functionalized carbon nanotubes (CNTs), as well as some conductive polymers such as polypyrrole or polyaniline, have been engineered to change properties when exposed to selected environmental factors. For instance, pristine CNTs, and the corresponding CNT networks, exhibit a noticeable change in resistance when exposed to changes in analyte or temperature. CNTs have also been polymer-functionalized to change in resistance when exposed to gases such as $CO_2$, $NH_3$, $CH_4$, or $C_2H_4$. Implementation of these sensors at large scales requires coupling of the changes in material properties to inexpensive, wireless communication and detection means that can be cost-effectively mass-produced.

A conventional UHF RFID system includes a reader and RFID tags that rely on backscatter to operate. The reader transmits power in the form of electromagnetic waves, which are then received by the tag antenna and used to power an integrated circuit (IC) on the tag. By changing its impedance, the IC changes the reflection of the waves back to the reader, thus communicating information stored on the IC. Other information, however, can also be extracted from the tag by analyzing its frequency response within the designated frequency band. Within the different RFID frequency bands, the ultra-high frequency (UHF) passive RFID band (between 902 MHz and 928 MHz in the United States) has been seen attractive option due to its read range, relatively small tag size, and widespread adoption in commercial settings for item tracking.

Currently, RFID technology has achieved widespread use in this field due to RFID tags already being produced at a bulk cost of approximately seven cents to fifteen cents, with prices trending towards an estimated five cents as widespread adoption grows. Existing RFID tags rely on the principle of sensing the return strength signal integrity (RSSI) of the tag. When the resistance of the sensing element changes, the RSSI correspondingly changes at all frequencies, and this change can be seen by the reader. A limitation of such an approach is that there cannot be a decoupling of the sensing of the sensor and the reader-tag separation distance because both can increase or decrease the RSSI over the entire frequency range. Some solutions attempt to remedy this issue by adding an on-off switch on the tag to allow the tag to provide a reference response to which the sensing response can be compared. A limitation of this approach is that the switch must be flipped by additional external components. Alternate embodiments utilize two tags, with one tag acting as a sensor and the second to act as the reference. Use of two tags in such a manner can result in approximately doubling the cost of each sensor, however, which, when done at scale, can cause a significant increase in overall costs.

Accordingly, new systems and methods for decoupling the sensing from the reader-tag distance while maintaining a design complexity and component count similar to that of UHF RFID tags are needed.

SUMMARY

The present application is directed to novel systems and methods for sensing changes in resistance of a sensing element in the frequency domain independent of a distance between the tag and a reader. Unlike conventional RFID tags, which use sensing materials to create sensors that work at a fixed reader-tag separation distance, the RFID sensors of the present embodiments include antenna designs that transduce a change in resistance of a sensing element to a frequency dependent change in the antenna frequency response. These RFID sensors can work independent of distance (within an operating range), and are able to sense changes in resistance of a sensing element with a conductivity similar to that of CNT networks. For example, sensing elements that are sensitive to one or more gases, e.g., $NH_3$, can be incorporated into the RFID sensors. In some embodiments, $NH_3$-functionalized CNTs can be deposited onto the RFID sensor in a designated area using a direct-write printer, creating $NH_3$ sensors using UHF RFID sensors. A novelty of the methods of the present embodiments includes intentionally generating two peaks using a single RFID sensor and manipulating one of the peaks and comparing it to a second, reference peak. Manipulation of the peaks can occur, for example, via one or more of comparing the damping between two resonant peaks, e.g., using one or more of the peaks as references while using one or more of the peaks as sensing elements, or by shifting the resonant frequency of the RFID sensor, as described in greater detail herein.

The systems and methods disclosed herein have a wide variety of potential applications. These include, by way of non-limiting examples, use in warehouse and food delivery settings to track ambient gases that are indicative of food spoilage or prioritization of shipments of expiring products in lieu of fresher counterparts. In some embodiments, the RFID sensors of the present embodiments can be placed in mine shafts to detect presence of poisonous gases, among others. In other embodiments, RFID sensors with appropriately selected sensing elements can detect changes in temperature, mechanical loading and/or impact, exposure to a threshold sound and/or light level, gases (e.g. carbon monoxide) and/or volatile organic compounds (VOCs) in areas with human traffic, among others.

One exemplary method of detecting an analyte includes capturing a presence of the analyte on one or more sensing elements disposed on, or coupled with, an antenna of an RFID sensor having one or more resonant peaks, and changing the frequency response of at least one peak of the one or more peaks. Changing the frequency response occurs independent of a distance between the RFID sensor and a reader configured to detect the RFID sensor.

The method can further include transducing the change in resistance of a sensing element of the one or more sensing elements to a frequency dependent change in the antenna frequency response without damping an entire frequency response of the antenna. In some embodiments, the action of changing the response of one of the resonant peaks can further include using one or more of the resonant peaks as a reference and another of the resonant peaks as a sensor reading. Changing the frequency response of at least one peak can include shifting a resonant frequency of the tag. The sensing element can include a material configured to change resistance in response to an environmental stimulus such as a presence of a chemical in gaseous or liquid contact with the sensing element.

The method can further include generating the one or more resonant peaks of the RFID sensor. An operating distance of the tag can be approximately in a range of zero meters to about four meters. In some embodiments, the RFID sensor can include a chipless RFID sensor. In some embodiments, the RFID sensor can operate in an ultrahigh frequency (UHF) band. One or more reference elements can be disposed on or coupled with the antenna of the RFID sensor. In some embodiments, the sensitive material can include a network of carbon nanotubes.

One exemplary radio frequency identification (RFID) sensor includes an antenna and an RFID integrated circuit (IC). The antenna has at least one sensing element that at least one of splits or reduces a surface current on a dipole in response to changes in at least one of chemical factors or environmental factors. The IC interfaces with an RFID reader and connects to the antenna. The antenna is configured to generate a plurality of resonant peaks, change one of the resonant peaks of the antenna, with the RFID sensor being configured to operate in an ultrahigh frequency (UHF) band, capture a presence of an analyte on the sensor element of the first dipole arm, and sense a change in resistance of the sensing element through the frequency response of the tag.

The tag can include an inductive loop, a second sensing element, a first set of dipole arms coupled to the sensing elements; and a second set of dipole arms configured to be used as a reference. Target frequencies of the two dipole arms can be such that the plurality of resonant peaks are indistinguishable and blend into one resonant peak at a given quality factor. The change of one of the resonant peaks can be achieved by shifting the apparent resonant frequency of the RFID sensor. The change in resistance can be sensed independent of a distance between the RFID sensor and the RFID reader. A maximum operating distance can be approximately in a range of about five meters to about ten meters. In some embodiments, the antenna can be sensitive to about <80% changes in the conductivity of the material.

The RFID sensor can include a strap that attaches the IC to the antenna. In some embodiments, the RFID sensor can include a substrate that supports the antenna. The at least one sensing element can have a substantially lower conductivity than an antenna material, with the sensing element including a nominal resistance approximately in a range of about 0.1 $k\Omega$ to about 10 $k\Omega$, and having dimensions of approximately 1×1 mm. The analyte can include a level of $CO_2$, NHs, $CH_4$, or $C_2H_4$.

BRIEF DESCRIPTION OF THE DRAWINGS

This disclosure will be more fully understood from the following detailed description, taken in conjunction with the accompanying drawings, in which:

FIG. 6A is a graph illustrating experimental results of a shifted effective transmission coefficient, $\tau_e$, along a:

DETAILED DESCRIPTION

Figure 1:
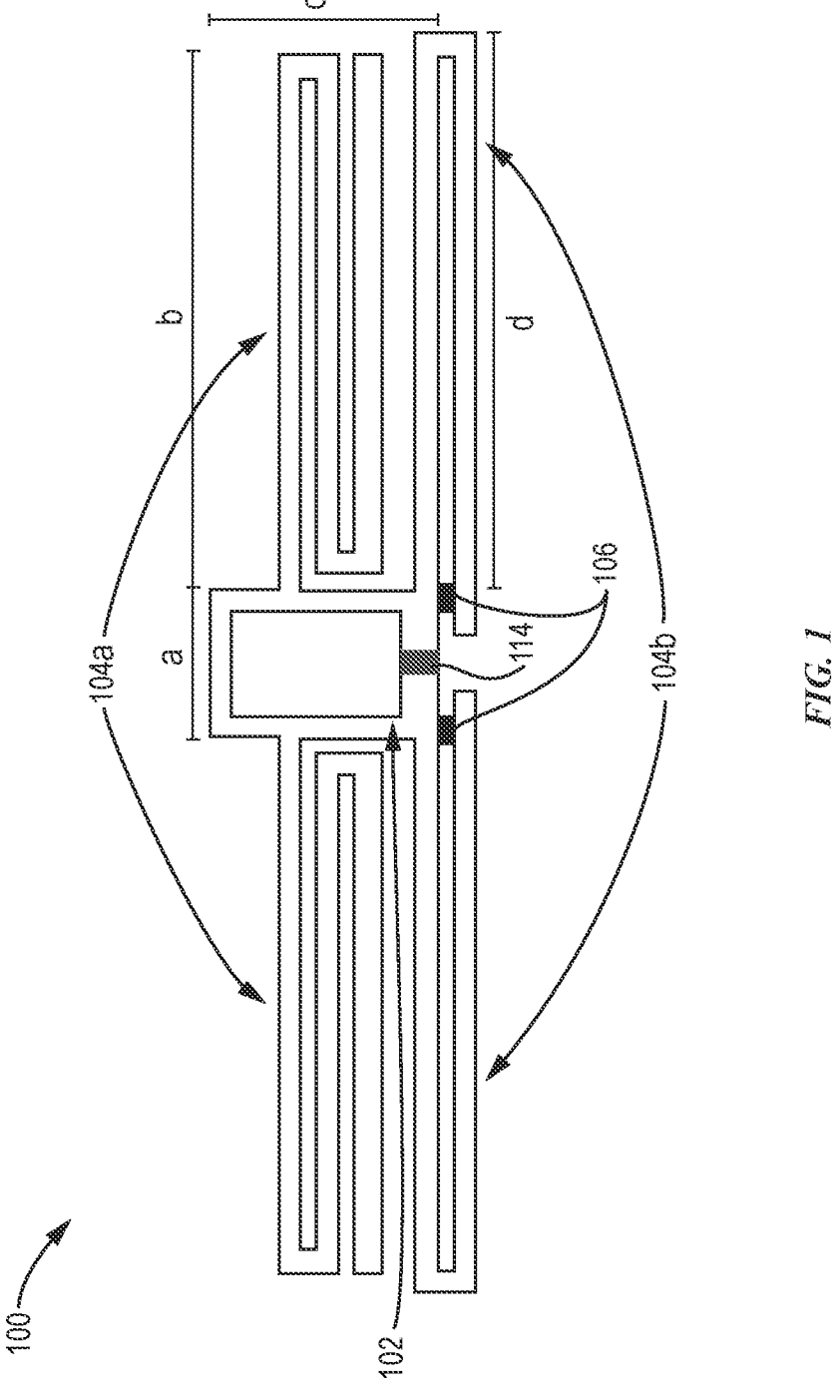
FIG. 1 is a schematic illustration of a topology of an antenna of the present embodiments that includes an inductive loop and two sets of dipole arms tuned for different frequencies.

Certain exemplary embodiments will now be described to provide an overall understanding of the principles of the structure, function, manufacture, and use of the tapes, films, devices, and techniques disclosed herein. One or more examples of these embodiments are illustrated in the accompanying drawings. Those skilled in the art will understand that the devices and methods specifically described herein and illustrated in the accompanying drawings are non-limiting exemplary embodiments and that the scope of the present disclosure is defined solely by the claims. The features illustrated or described in connection with one exemplary embodiment may be combined with the features of other embodiments. Such modifications and variations are intended to be included within the scope of the present disclosure. Further, to the extent features, layers, sides, objects, steps, or the like are described as being "first," "second," third," etc., and/or "lower," "upper." "middle," etc., such numerical and/or location ordering/identification is generally arbitrary, and thus such numbering can be interchangeable unless indicated or otherwise understood by those skilled in the art to not be interchangeable.

To the extent the present disclosure includes prototypes, mock-ups, schematic illustrations, bench models, or the like, a person skilled in the art will recognize how to rely upon the present disclosures to integrate the techniques, systems, devices, and methods into a product, such as a commercially viable RFID sensor and/or an RFID sensor incorporated into a bigger object that is the product. Terms commonly known to those skilled in the art may be used interchangeably herein. By way of non-limiting example, the terms "sensing element" and "resistive element" can be used interchangeably herein to refer to elements that react to the environment and/or has electrical characteristics that are similar to that of a resistor. Still further, to the extent particular materials, dimensions, parameters, times, temperatures, manufacturing techniques, etc. are used in conjunction with one or more of the present disclosures and/or described tests, a person skilled in the art will appreciate often such uses are non-limiting examples, and the skilled person will understand other materials, dimensions, parameters, etc. that can be used, in view of the present disclosure, without departing from the spirit of the present disclosure.

The system and methods of the present disclosure are directed to a damped double dipole antenna device enabling UHF RFID sensors that are able to sense changes in resistance of a sensing element independent of a distance between a tag and a reader. The sensing element can include a conductivity similar to that of printed CNT networks that allow for detection of environmental changes and/or chemicals across a frequency domain, e.g., within the near-field and/or far-field read range, with similar design intentions being applied to tags in the near-field as the far-field. By operating in the frequency domain, the proposed RFID sensors are able to communicate changes in resistance of a resistive sensing element in a passive, wireless, and cost-effective manner.

To produce a frequency dependent change in the frequency response of the tag, a resistive element can be used to split the surface current on the antenna, thus changing a characteristic length of the antenna which influences its impedance. In conventional RFID tags, the sensing element can be added to change the current path across the meandered dipole section the antenna. This approach, however, requires current that changes the characteristic length of the dipole to pass through the sensing element. When considering sensing elements with relatively high resistance, this can result in severe degradation of tag performance. Moreover, in these conventional approaches, the response of the tag is typically either insensitive to changes in the sensing element and/or requires a large amount of current to account for the resistive losses of the sensing element.

The antenna topology can be modified to address both the issues of sensing in the frequency domain and maintenance of tag performance. FIG. 1 illustrates a topology of an exemplary embodiment of such an antenna 100. As shown, the antenna 100 can include an inductive loop 102 and two sets of dipole arms 104a, 104b, alternatively referred to as dipoles. By using two sets of dipole arms 104a, 104b, a first dipole arm 104a can be used as a reference while a second dipole arm 104b varies in its transmission coefficient, t, as the sensing element changes in resistance. The dimensions of each dipole arm pair 104a, 104b can be chosen to allow either of the two sets of dipole arms 104a, 104b to include a sensing element 106, as discussed further below. The antenna of the present embodiments can be sensitive to about <80% changes in the conductivity of the material.

One or more of the dipole arms 104a, 104b can include sensing elements 106 (resistive, capacitive, among others), sometimes referred to as sensors, associated therewith. In some non-limiting embodiments, each of the sensing elements 106 can include a sensitive material, such as functionalized CNTs, disposed thereon, and the CNTs can be capable of detecting the presence of environmental changes and/or chemicals. Once presence is detected, the sensing element(s) 106 can change resistance upon changes in chemical and/or environmental factors. These changes can be detected to determine, for example, the presence of one or more gases. Some non-limiting examples of such gases can include $CO_2$, $NH_3$, $CH_4$, $H_2$, or $C_2H_4$, among others.

CNTs can be prepared using techniques known to one skilled in the art prior to being associated with the dipole arms 104a, 104b. For example, the CNTs can be doped to include additional charge carriers. The CNT material can exhibit a change in conductivity when exposed to a variety of analytes, e.g., 4% ammonia ($NH_3$), and thus a change in resistance. In some embodiments, single-walled CNTs can be used to sense changes in ammonia exposure by measuring a turn-on power of the tag. Polymer functionalizations can target a variety of gases including, for example, $H_2O_2$, $C_6H_{10}O$, and/or $H_2O$, or can increase sensitivity to $NH_3$, and changes in resistance of the functionalized CNT networks can be read through (near field communication, i.e., NFC) RFID sensors. Moreover, moisture sensors can also be made with RFID sensors, varying the tag performance based, for example, on the absorption of a liquid into a substrate. In some embodiments, direct-write printing can be used to repeatedly deposit CNT inks, with details and techniques for such a process being recognized by one skilled in the art. Preparation of the CNTs can occur separately from the tag 110 such that the tag does not undergo the steps of preparation of the CNTs, e.g., oxidation, baking, heating, and so forth. In such embodiments, once prepared, the CNTs can be attached or otherwise associated with the tag 110 and placed on objects for detection of environmental changes and/or chemicals.

The sensing elements or resistive elements 106 of the antenna 100 of the present embodiments, the elements 106 being able to react to the environment and/or have electrical characteristics that are similar to that of a resistor, as mentioned above, can be less conductive than the metals traditionally used for RFID antennas. This can enable the use of CNT-based sensing elements, which can be functionalized to allow for the selection of chemirestivity in response to various environmental factors. For example, the sensors of the present disclosure can include those having a nominal resistance approximately in a range of about 0.1 k$\Omega$ to 10 k$\Omega$ for a 1 mm wide thin film over a gap of about 1 mm. While FIG. 1 illustrates two sensing elements 106 with each element associated with an arm of the second set of dipole arms 104b, in some embodiments the tag 110 can have a reference element, which can use the same design intent and/or method as the sensing element 106 discussed above. Alternatively, or additionally, the tag 110 can be used without a reference element, with the reference instead being a reference resistance, such as ambient air, or something that can exhibit a reference resistance. It will be appreciated that the reference resistance can be tailored to have a reference property, e.g., capacitance, that is compatible with the tag 110 to make sensor readings. e.g., as a means for transmitting sensor information. Moreover, it will be appreciated that the sensing elements 106 can be associated with an arm of the first set of dipole arms 104a, and/or can use one sensing element or three or more sensing elements in a given set of dipole arms 104a, 104b.

Varying the relative t of each dipole of the antenna 100 can affect changes in resistance within the sensors to designate a sensor as the frequency response of the dipole with the sensing element 106 to the frequency response of a reference element (e.g., a reference dipole). For example, by varying the relative t of each dipole of the tag antenna, changes in resistance of approximately 35% can be sensed.

Figure 2:
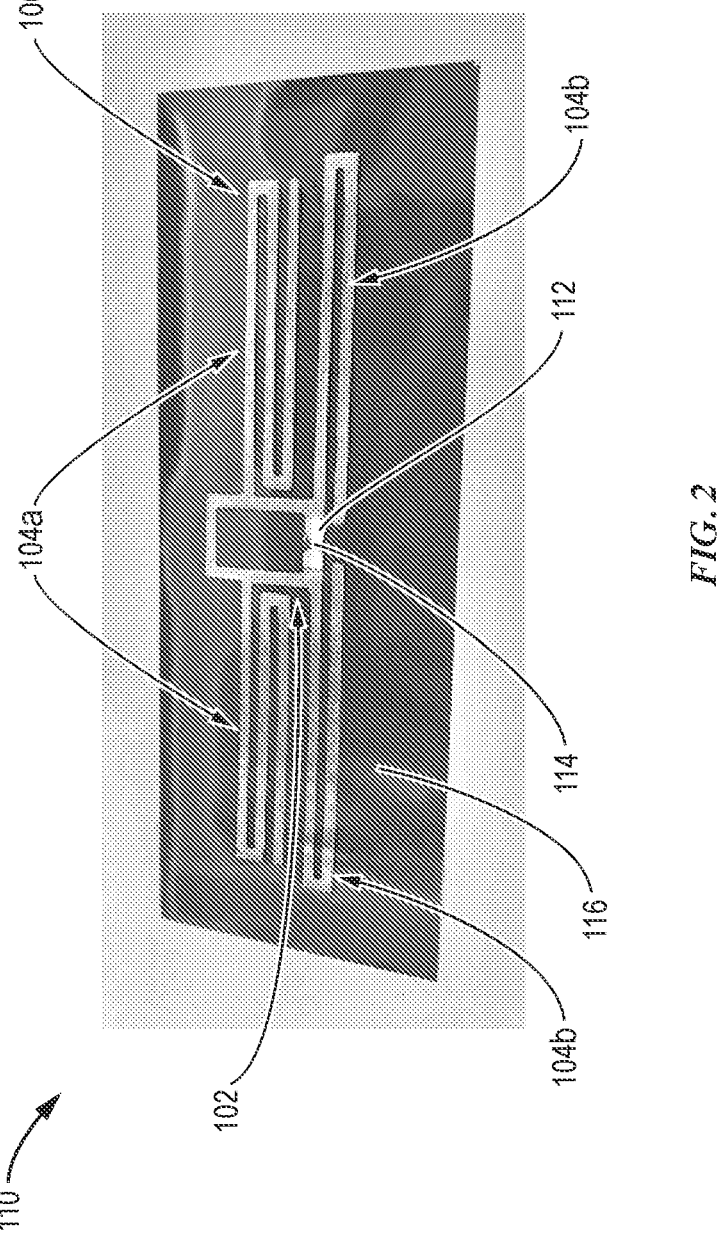
FIG. 2 is a perspective top view of a prototype RFID sensor of the present embodiments constructed from copper foil that includes the antenna of FIG. 1 therein.

FIG. 2 illustrates an exemplary embodiment of a radio frequency identification (RFID) tag 110 with a sensor for detecting environmental changes and/or chemicals of the present embodiments. The RFID sensor 110 of the present embodiments includes the antenna 100, a strap 112, an RFID chip or integrated circuit (IC) chip 114, and a substrate 116. It will be appreciated that while the terms "RFID tag" and "RFID sensor" can be used interchangeably, a person skilled in the art will recognize that an RFID tag is considered to be a device that is typically passive and/or unpowered that responds to an RFID reader with its ID and other digital data, while an RFID sensor is a subset of an RFID tag, and is a tag designed to act as a sensor. That is, the RFID sensor 110 of the present embodiments is an RFID sensor 110, though, in some embodiments, an RFID tag can also be used. In some embodiments, the strap 112 can be omitted from the tag. The strap 112 can at least help make manufacturing easier. The RFID sensor 110 of the present embodiments can be constructed using cutting and/or etching of a metal foil, such as copper or aluminum, deposition and/or etching of metal thin film, and/or printing of conductive inks.

The IC 114 can be positioned on the inductive loop 102 of the antenna 100 to separate the arms. The IC 114 can include an impedance Zc that is typically listed in the IC datasheet as the impedance at the turn-on threshold power of the chip. As a result, characterization of the performance of the tag 110, if relying on Zc, occurs at, or close to, a threshold power of the tag 110. Additionally, UHF RFID readers can frequency hop over different bands at given time intervals, as mandated by the US FCC regulations to prevent the jamming of channels.

The inductive loop 102 can be designed to impedance match the capacitive impedance of the IC 114. The dipole arms 104 can then be designed to radiate at the desired frequencies and can be meandered to reduce the footprint of the tag. As shown, two sets of dipole arms, e.g., dipole pairs 104a. 104b can be added to the tag 110, radiating at slightly different frequencies around the desired frequency band. The sensing element 106 can then be used to damp one dipole pair 104b of the two dipole pairs 104a, 104b, varying the performance of that dipole pair 104b as it changes in resistance. For example, a damping element can be placed on the lower frequency dipole 104b, as shown, though in some embodiments it can be located on the higher frequency dipole 104b. Depending on the target resistance range and/or the difference in target frequencies of the two dipoles, sensing can be achieved, for example, by shifting the resonant frequency of the tag 110 or by comparing the damping between the two dipoles. It will be appreciated that the comparing action can be a signal processing operation performed by the reader, among other options understood by those skilled in the art in view of the present disclosures.

A non-limiting example of the IC 114 can include the NXP UCODE7 device (available from NXP Semiconductors of Eindhoven, Netherlands), with a listed complex impedance of 12.5-j277$\Omega$ to 13.5-j195$\Omega$ at 915 MHz depending on its mounting to the antenna. T-match antenna RFID sensors can be used to narrow this range, as well as to include the strap 112 in the lumped impedance, with similar IC mounting to the RFID sensors of the present embodiments, which can result in a lumped impedance closer to Zc=12.5-j250$\Omega$. It will be appreciated that the T-match antenna can be selected due to its low number of dimensional parameters and well-characterized performance. With this impedance, the tag can be designed so that the lower frequency dipole 104b is matched with the IC 114 impedance.

In some embodiments, the strap 112 can attach the IC 114 to the antenna 100. The substrate 116 can support one or more of the antenna 100, the IC 114, and the strap 112. Some non-limiting examples of the substrate can include a Kapton substrate, FR-4, and/or other dielectric materials.

As noted above, the antenna 100 of the present embodiments can transduce a change in resistance of the sensing element 106 to a frequency dependent change in the antenna frequency response. While the sensing element 106 can damp the antenna frequency response, the function of the sensing element is not limited to only damping, unlike conventional sensing methods which operate only by sensing the damping. Some non-limiting examples of other functions of the sensing element 106 of the present embodiments can include shifting of the resonant frequency, as discussed in greater detail below. For example, the instantly disclosed systems and methods can change the amplitude of the resonant response of the antenna and/or change the frequency at which it occurs, which cannot performed by conventional systems and methods. Additionally, the sensing element 106 of the present embodiments does not substantially impact the entire frequency response of the antenna. That is, different element(s) can be used to damp different areas and/or frequencies of the response selectively. In contrast, conventional methods typically have one resonant frequency and that frequency is typically damped. A person skilled in the art will recognize that the term "does not substantially impact" refers to levels of damping that are not detectable by a conventional RFID reader. In some embodiments, "does not substantially impact" can refer to the sensing element 106 damping the frequency response by about 10% or less, by about 5% or less, by about 3% or less, by about 1% or less, or no damping having occurred. In some embodiments, readings from the sensing element 106 can therefore be used as a means for transmitting sensor information by the peaks.

For example, the sensing element 106 on the dipole arm 104b can be used by at least two methods of operation. The damped double dipole antenna 100 can function by having two resonant peaks at nearby frequencies, with the peaks being generated by the antenna 100 and influenced, e.g., damped or shifted, by the sensing element 106. By damping one of those peaks, the effect or influence that peak has on the resultant frequency response of the tag 110 can be changed. For example, resistance change can change the frequency response. Damping one of the peaks can move a resonant frequency to increase and/or decrease said frequency, with the tag 110 then being read by peak shift or damping, as discussed below.

In some embodiments, the sensing element can shift the resonant frequency of the RFID sensor 110. For example, when the resistance of the sensing element 106 is low, decreasing, or if the target frequencies are sufficiently close, the two resonant peaks of the antenna 100 can merge into one. Closeness of target frequencies can be based, at least in part, on a relative proximity of the peak to the UHF frequency band, which can be, in at least some instances, about 26 MHz. In some embodiments, the closeness of the target frequencies can be based, at least in part, on a quality factor (Q factor) of the resonant peaks. In such embodiments, sufficient closeness for target frequencies can indicate that for a given quality factor (Q), the two independent resonant peaks can become undistinguishable and blend into one resonant peak.

Figure 3A:
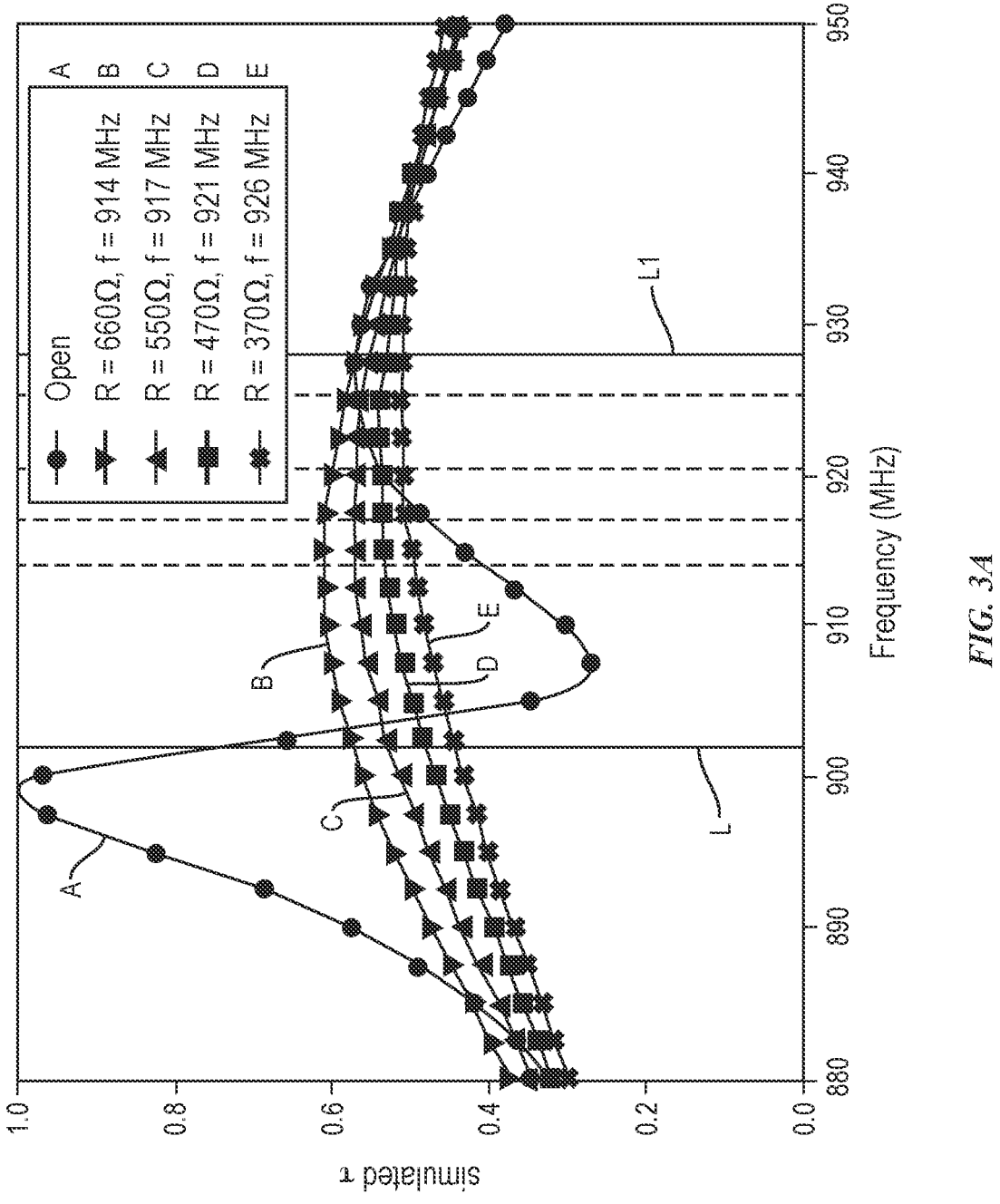
FIG. 3A is a graph illustrating sensing by peak shifting with the resultant peak shifting upwards as the resistance decreases.
Figure 3B:
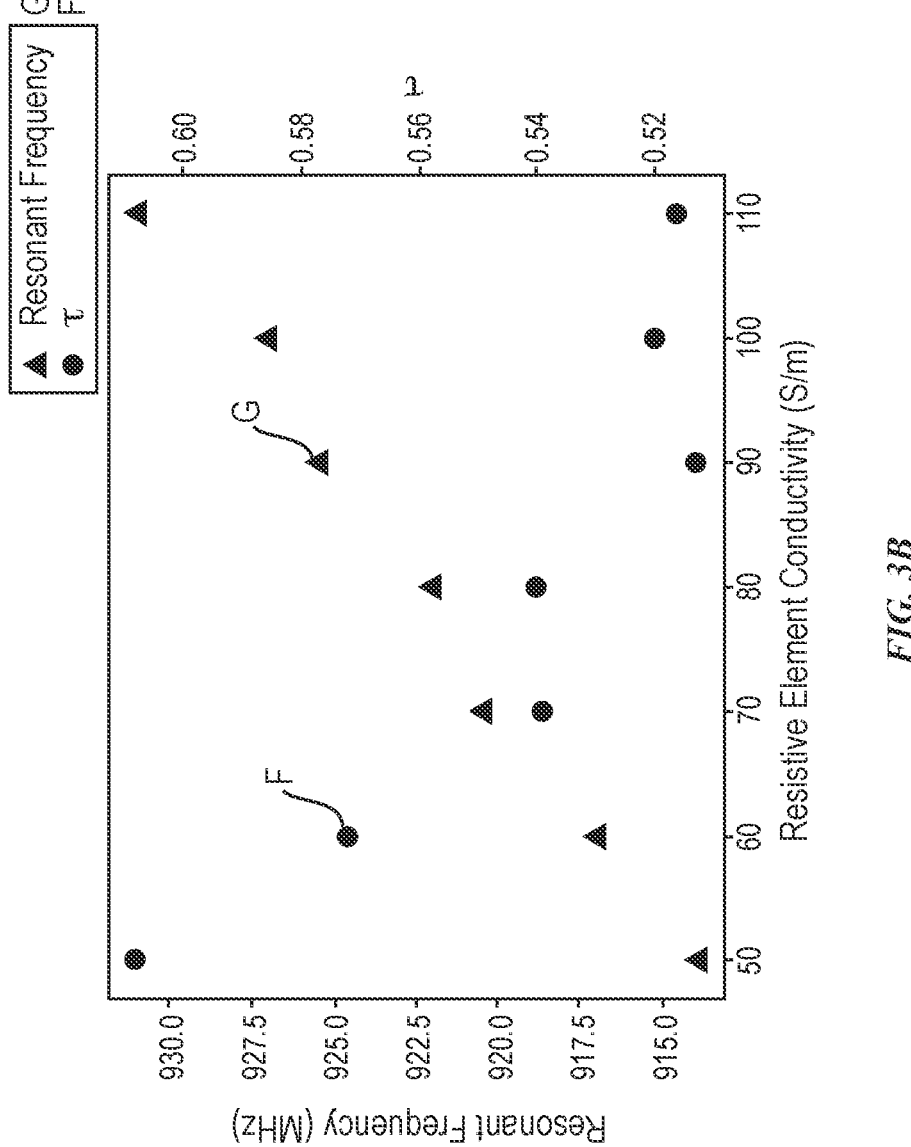
FIG. 3B is a graph illustrating the resonant frequency at each sensing element conductivity.

FIGS. 3A-3B illustrate peak shifting in greater detail within the UHF band defined by lines L and L1 (the 902 MHz to 928 MHz window). In peak shifting, a single peak can be formed by combining two original peaks, or, in the case of three original peaks, all three peaks can be combined into a single peak and/or two of the three original peaks can be combined into a single peak. For peak shifting, the relative amplitude of the two resonant peaks can dictate the resultant peak frequency. For example, the relative amplitudes of resonant peaks can be changed by a damping element (not shown), which can decrease the influence of the damped dipole on the resultant resonant peak as compared to the undamped dipole when the peaks are merged. In some embodiments, the RFID sensor 110 can include a chipless RFID sensor. In at least some embodiments in which a chipless RFID sensor is used, the RFID sensor can operate in the GHz range.

As a result, as shown in FIG. 3A, the damping of the lower frequency dipole can increase as the resistance of the sensing element 106 decreases, which can shift the resulting peak up in frequency, e.g., to the right. For example, peak A having an open resistance can have a frequency outside of the UHF band, while peak B, which results from damping peak A having a resistance of 660 ohms, can have a frequency of 914 MHZ. Further damping of the peak results in peaks C, D, and E, as shown, due to lower resistances of the sensing element 106. When merged, the influence of these peaks can be lower, which accounts for the higher resonant frequencies for peaks C, D, and E. It will be appreciated that the resistance and resonant frequency can have a substantially linear relationship. This relationship only holds within a certain operating range, as the peak may shift past the higher frequency dipole, and too high of a resistance can change the shape of the response altogether. In some embodiments, peak shifting can include forming a single peak by combining the two original peaks.

FIG. 3B illustrates values for resonant frequency at each sensing element conductivity. As shown, the resonant frequency can exhibit a linear relationship resistive element conductivity. Line F indicates the peak transmission coefficient, t, at each sensing element conductivity.

In alternate embodiments, the sensing element 106 can compare the damping between two resonant peaks. With higher resistance sensing elements or with target frequencies farther apart, the resonant peaks produced by the reference dipole and the dipole with the sensing element 106 can remain distinct in the frequency response of the tag 110. In this regime, τ at the upper end of the frequency band can remain relatively unchanged, while τ at the low end of the frequency band, where the damping takes place, can vary. It will be appreciated that the instant methods can accommodate a wide range of sensing element 106 resistances, as either of the peaks can be moved closer or farther from the frequency band, raising or lowering their effective t before damping occurs. Relative damping can be easier to tune experimentally, with any change in response being seen within the UHF band defined by lines L' and L1' (the 902 MHz to 928 MHz window).

Figure 4A:
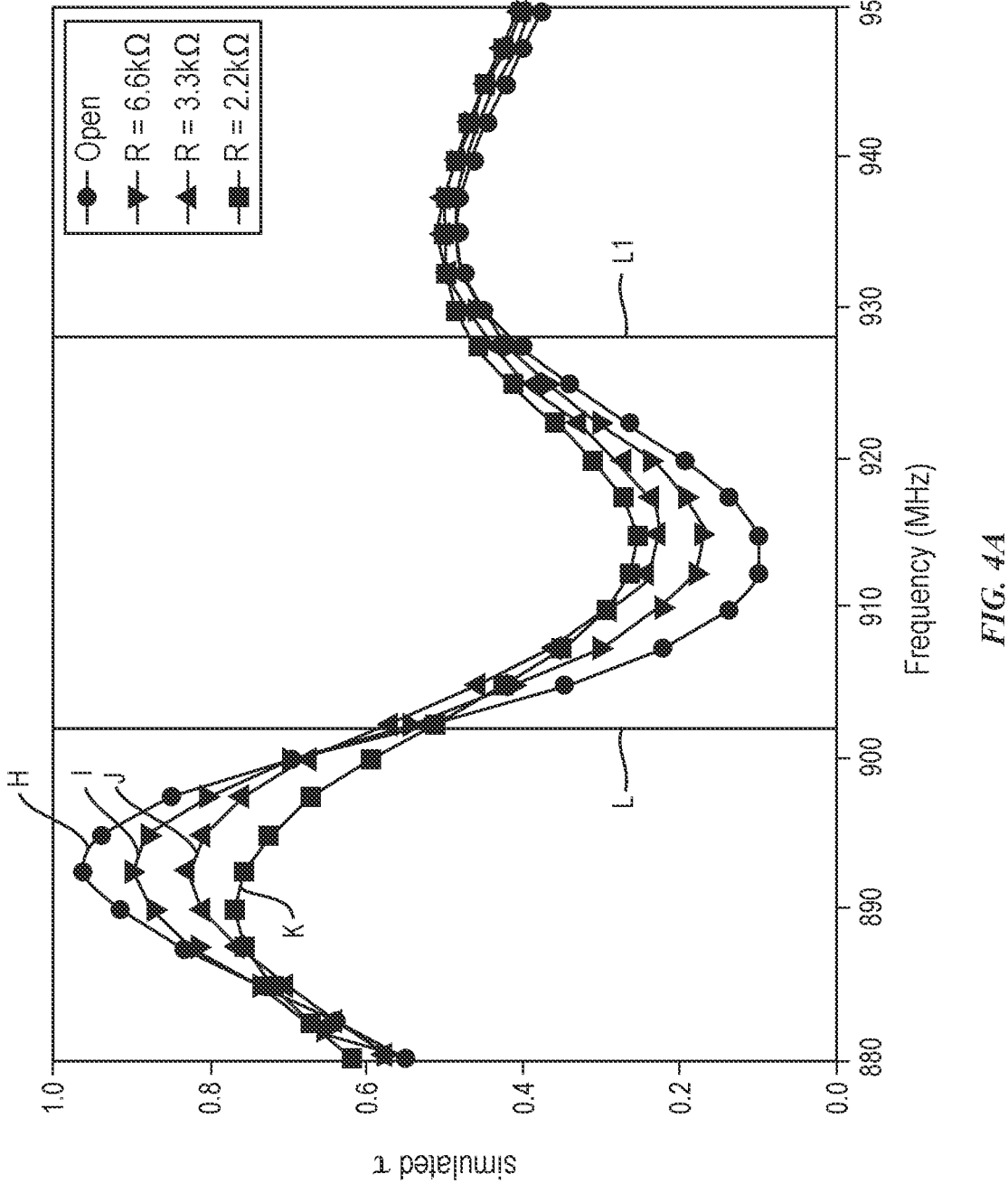
FIG. 4A is a graph illustrating sensing by relative damping of the lower frequency peak while using the higher frequency peak as a reference.
Figure 4B:
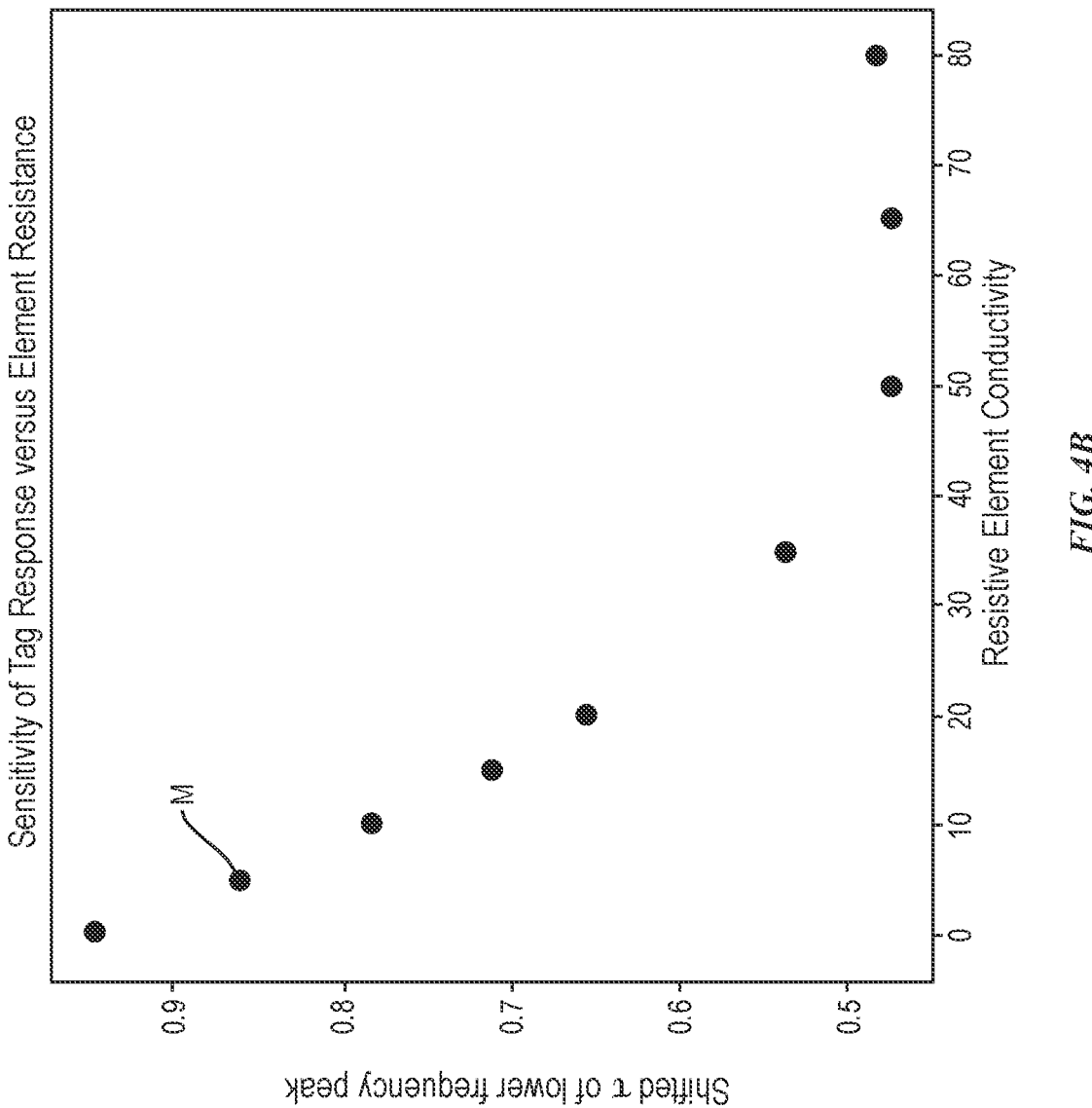
FIG. 4B is a graph illustrating the resonant frequency at each sensing element conductivity.

Sensing by relative damping in this range is shown in greater detail in FIGS. 4A-4B. For example, FIG. 4A illustrates tuning of a lower frequency peak H by damping, while using a higher frequency peak as a reference. As resistance decreases from no resistance to 6.6 kΩ, 3.3 kΩ, and 2.2 kΩ, to form peaks I, J, and K, respectively, damping increases and τ at lower frequencies decreases, as shown. It will be appreciated that during the damping, the higher frequency peak K, which can occur around 930 MHZ, can remain relatively unchanged.

For example, peak A having an open resistance has a frequency outside of the UHF band, while peak B, which results from damping peak A having a resistance of 660 ohms, has a frequency of 914 MHz. Further damping of the peak can result in peaks C, D, and E, as shown, due, at least in part, to lower resistances of the sensing elements 106.

FIG. 4B illustrates that in a specific conductivity range, corresponding to a resistance range, the tag 110 can be sensitive to changes in resistance. For example, as the conductivity increases outside of the target range, t can become less sensitive to changes in resistance as shown by line M.

One or more resistors can be added to the tag 110 to validate results of one or more of the methods. For example, one or more resistors can be associated with the sensors, e.g., the sensing element 106, to show a relative change in the effective antenna transmission coefficient. The resistors can be surface mounted, glued, clipped, stapled, and/or otherwise attached to the antenna as alternatives to sensitive elements. Different valued resistors can be used to replicate the sensing element(s) both before and after sensing.

In some embodiments, the tag 110 and the above-described methods can integrate two sensing modes into a single tag. For example, one sensor can resemble the sensors discussed above, while another can be added in series or parallel with Za, damping the entire response of the tag 110. At a fixed distance this can allow decoupling of the two sensors by sensing both the RSSI at all frequencies as well as changes response in the frequency domain, when operating at a fixed distance. The production and blending of multiple resonant peaks can also be used for other applications, including tuning of powered RF devices or other types of RFID sensors. Inexpensive RF devices, which can use a finely tuned resonant frequency, may include tuning of a capacitive or inductive element, though in some embodiments, tuning can occur using resistive elements in lieu of the inductive element.

Figure 5:
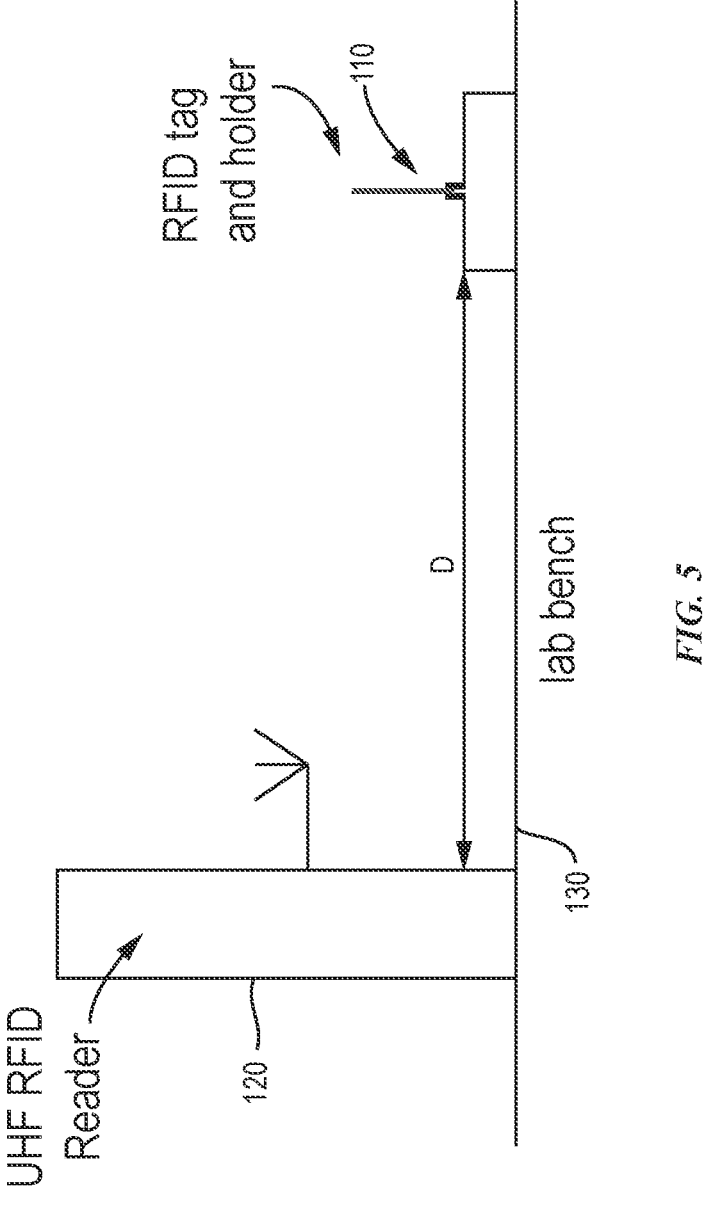
FIG. 5 is a schematic side view of positioning of the RFID sensor of the present embodiments with respect to a reader on a lab bench.

The tag 110 of the present embodiments is a sensing tag that functions over a range of distances. FIG. 5 illustrates an experimental setup of the RFID sensor 110 spaced apart a distance D from a reader 120, e.g., a UHF RFID reader, set up on a lab bench 130. The IC 112 of the tag 110 can communicate with the reader 120, with the frequency response then being extracted from the reader 120. Data from the reader 120 can be interpreted to compare the peaks and/or test the resonant frequency, among other analyses. The distance D between 20) the tag 110 and the reader 120 does not need to be fixed. For example, the distance D between the tag 110 and reader 120 can vary such that the tag 110 of the present embodiments can operate independently of the reader-tag separation distance. At distances D smaller than 1 meter, e.g., approximately in the range of about 50 cm to about 75 cm, near field effects begin to influence the response of the tag. In some embodiments, at distances D larger than about two meters, because some frequencies have a low t, full characterization of the tag 110 may not be possible. It will be appreciated that the tag 110 can function at distances larger than two meters, as a response is not needed at all frequencies to extract a reading. In some embodiments, based on the tag 110 including an undamped maximum read distance of about 6.8 meters, and the relative power required at the lower distances, a maximum operating distance can be up to 10 meters, and/or approximately in a range of about five (5) meters to about ten (10) meters. In some embodiments, the operating distance can be approximately in a range of about zero (0) to about four (4) meters and/or approximately in a range of about three (3) meters to four (4) meters. Other ranges are possible. Further, a person skilled in the art will recognize that as distance between the reader and the tag increases, detection exhibits decreased confidence.

One or more of the RFID sensor 110 and/or the reader 120 can be disposed on a garment worn by a user. Some non-limiting examples of such garments can include a sweater, a helmet, a hat, a shoe, and so forth to enable hands-free tracking.

Figure 6A:
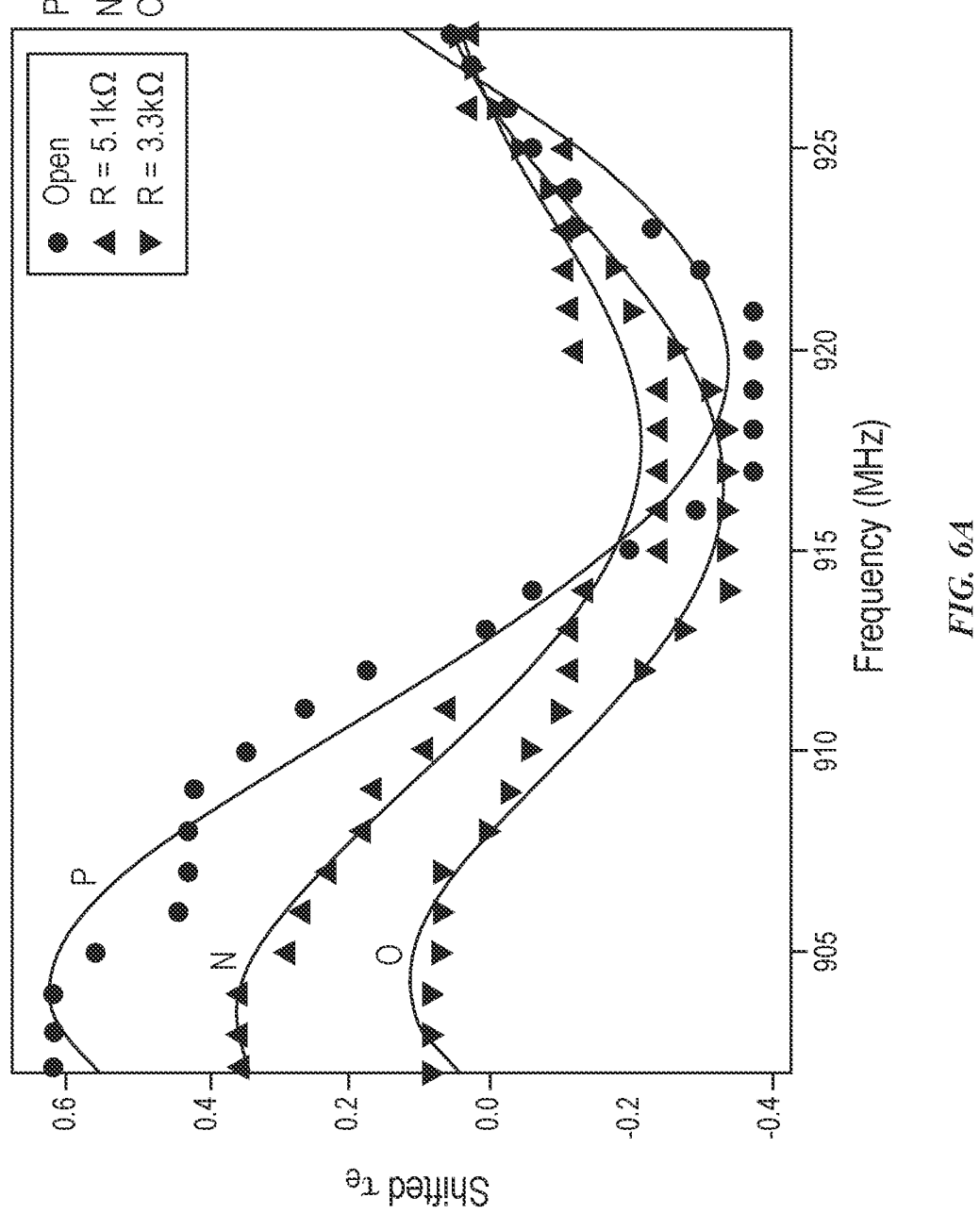
Figure 6B:
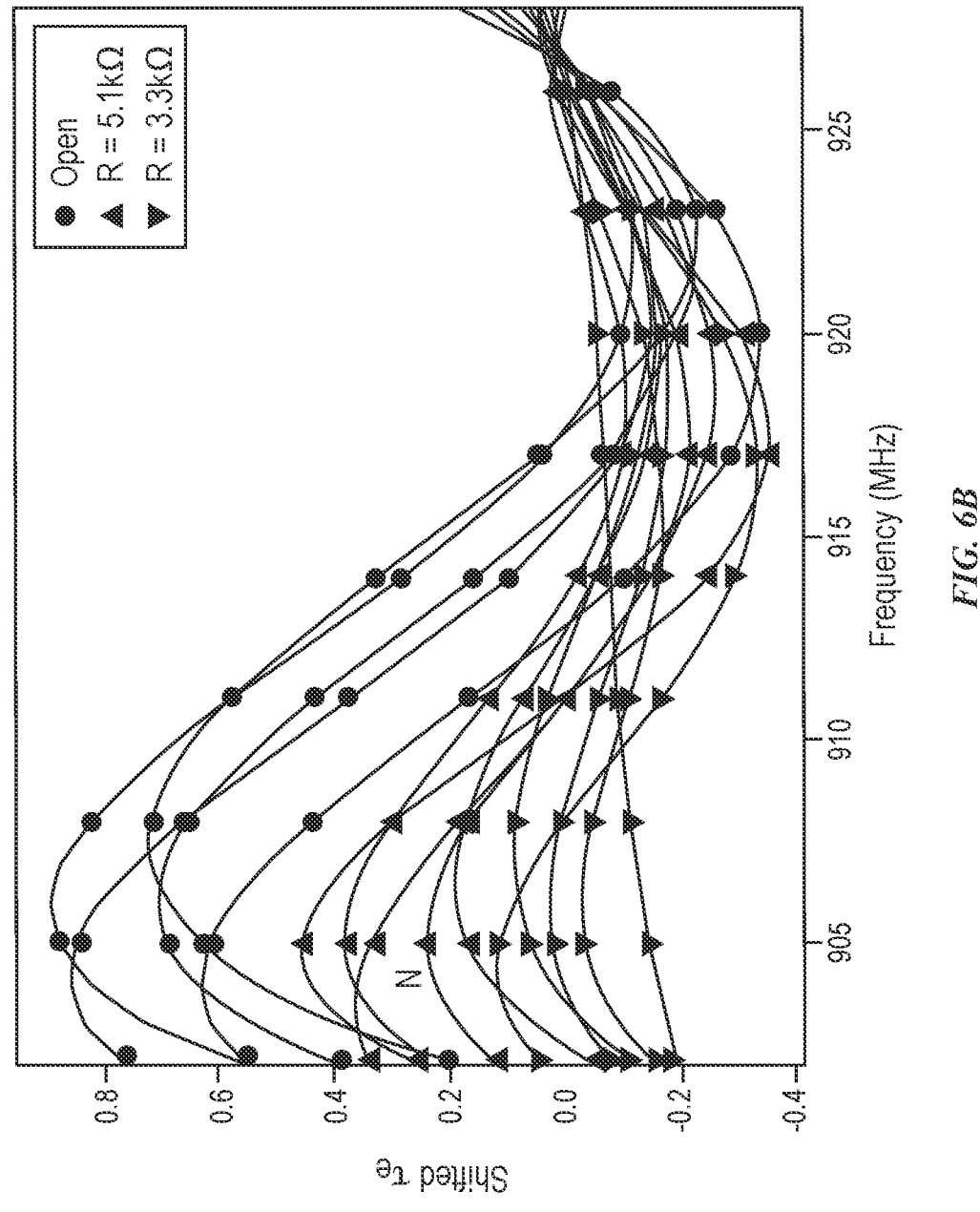
FIG. 6B is a graph illustrating experimental results of shifted the of FIG. 6A along a polynomial fit.

For each resistance, the effective transmission coefficient, $\tau_e$ can be found and then shifted such that the average of the 25% highest frequencies is at $\tau_c$=0). A person skilled in the art will recognize that the transmission coefficient can be backed out from the reader-tag distance D, reader power, and/or a few other parameters while the effective transmission coefficient is the same metric, but with the unchanging parameters not included. In order to calculate the effective transmission coefficient, the maximum and minimum transmission coefficients for a set of experiments can be calculated. The minimum transmission coefficient value can then be subtracted from every transmission coefficient in that set and the result can be divided by the maximum-minimum. This results in transmission coefficients between 0 and 1 for a given experiment. Effectively, this calculation is a way to map our range of values to between 0 and 1 for ease of use. The plots can then be "shifted," such as for visualization purposes, using the higher frequency $\tau_c$ values as a reference. FIG. 6A illustrates the results of the shift at 150 centimeters for no resistance (P) and the 5.1 kΩ and 3.3 kΩ resistors (N and O, respectively). The polynomial fit curves for all distances are shown in FIG. 6B. As shown, the polynomial fit for each of P, N, and O resemble the plots of the $\tau_c$ shift of FIG. 6A, thereby proving that the accuracy of the experiment. Moreover, with no resistor in place, the is highest at the lower end of the frequency band. In some embodiments, when adding a resistor to the corresponding dipole reduces its $\tau_c$ by varying amounts. The sets of curves for the 5.1 kΩ and 3.3 kΩ resistors (N and O, respectively) as compared to no resistance (P) indicate a distinguishable change in the response for a 35% change in resistance. Due to the noisy nature of the passive RFID system, multiple measurements can be taken to confidently determine the frequency response of the tag.

The Gaussian distribution framework can allow the tag 110 to be used, either for sensing continuous changes in the sensing element properties or, for detecting larger, binary changes in properties. In the first case, a larger number of samples will likely be taken, while in the latter case, one could sample only the lower and higher frequencies in the band to extract a measurement, which may result in faster read times at a small cost in confidence or resolution.

Figure 7B:
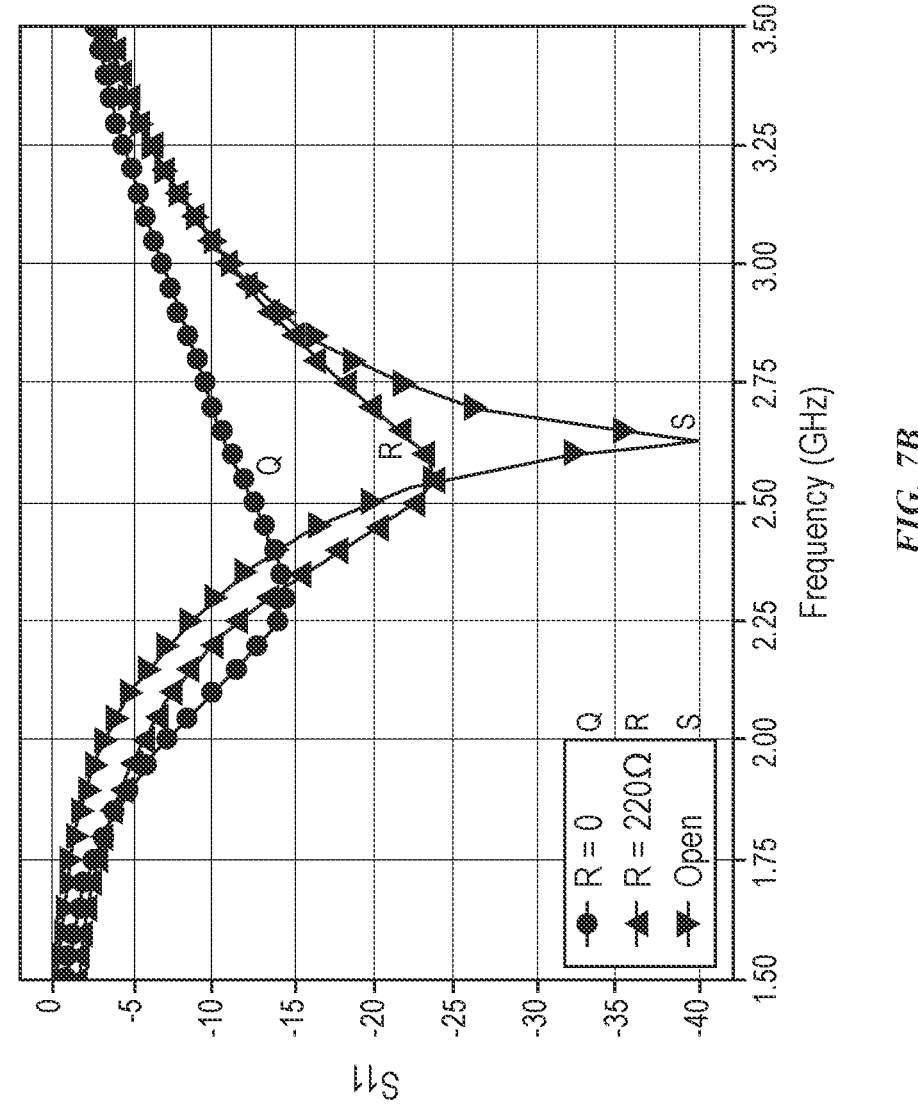
FIG. 7B is a graph illustrating performance of the parallel inverted L PCB antenna of FIG. 7A as compared to a traditional inverted L antenna.
Figure 7A:
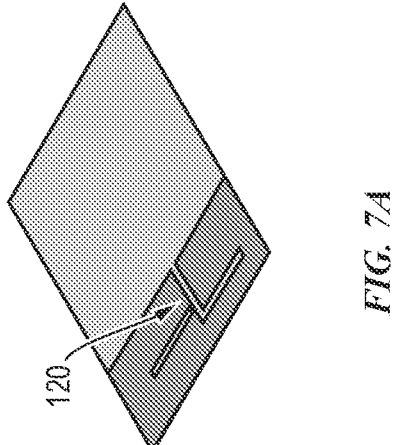
FIG. 7A is a schematic perspective view of a parallel inverted L printed circuit board (PCB) antenna.

Moreover, intentional shifting of the resonant peak can, in some embodiments, be used to increase the bandwidth of the antenna. For example, FIG. 7A illustrates an example embodiment of a parallel inverted L printed circuit board (PCB) antenna 120', while FIG. 7B illustrates a graph of the performance of the PCB antenna 120' at resistances of 0 and 220 (curves Q and R, respectively) as compared to a traditional inverted L antenna (curve R). As shown, as the resistance of the resistive element 106 decreases, performance in the lower frequency range can increase and the corresponding resonant peak can shift downwards. The effectively increased bandwidth can then be used by embedded antennas to operate in frequency ranges where hopping over a wide band is required.

Figure 8A:
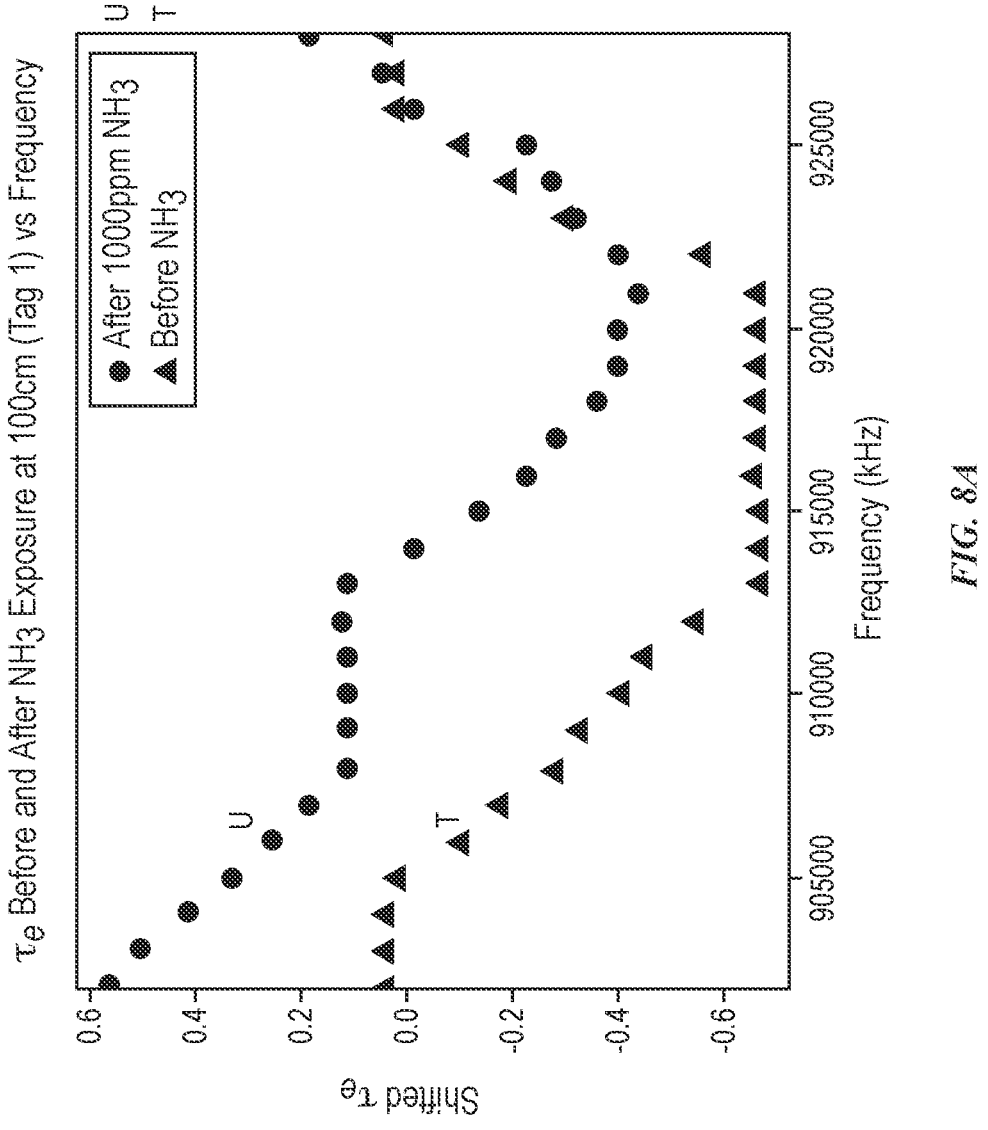
FIG. 8A is a graph illustrating carbon nanotube RFID sensor and $\tau_e$ experimental results for a tag after exposure to ammonia at 100 centimeters.
Figure 8B:
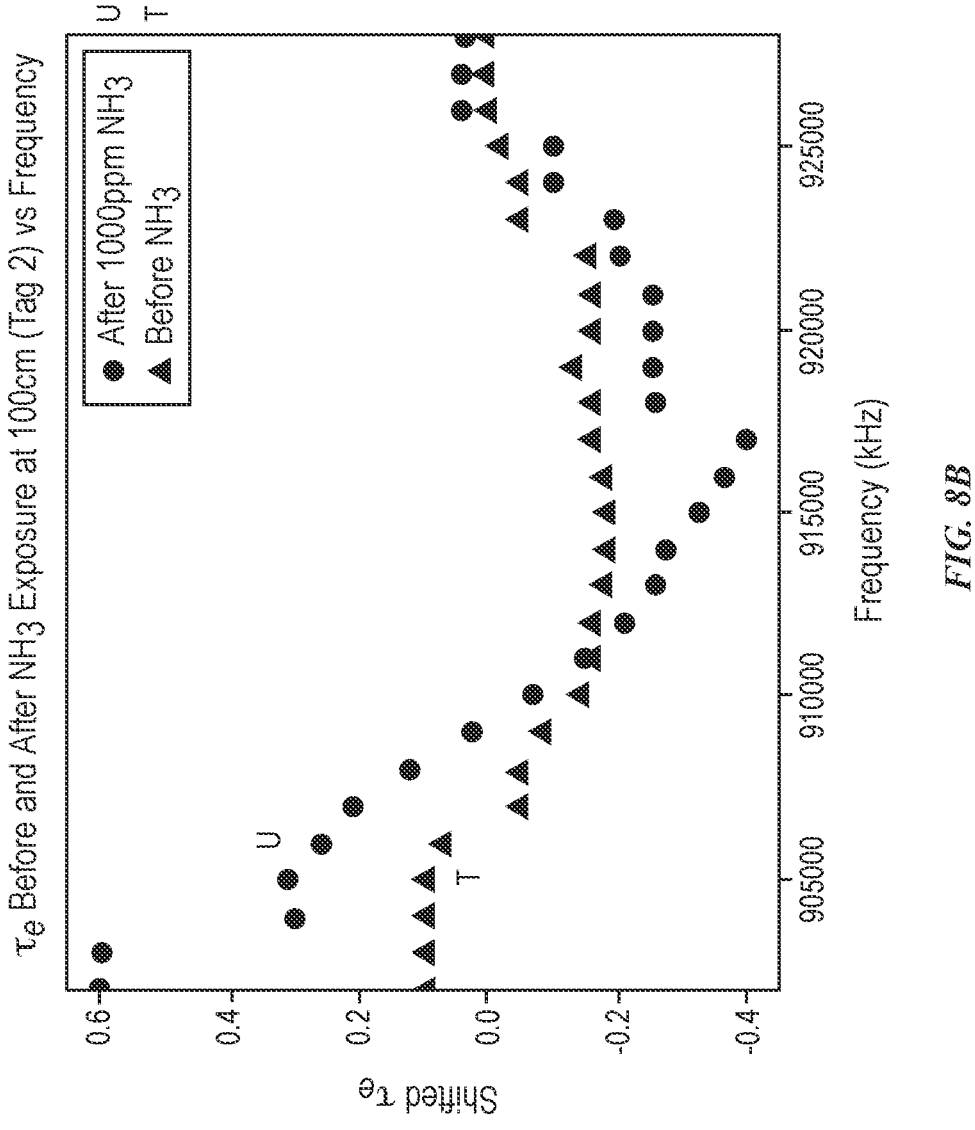
FIG. 8B is a graph illustrating carbon nanotube RFID sensor and $\tau_e$ experimental results for a second tag after exposure to ammonia at 100 centimeters.
Figure 8C:
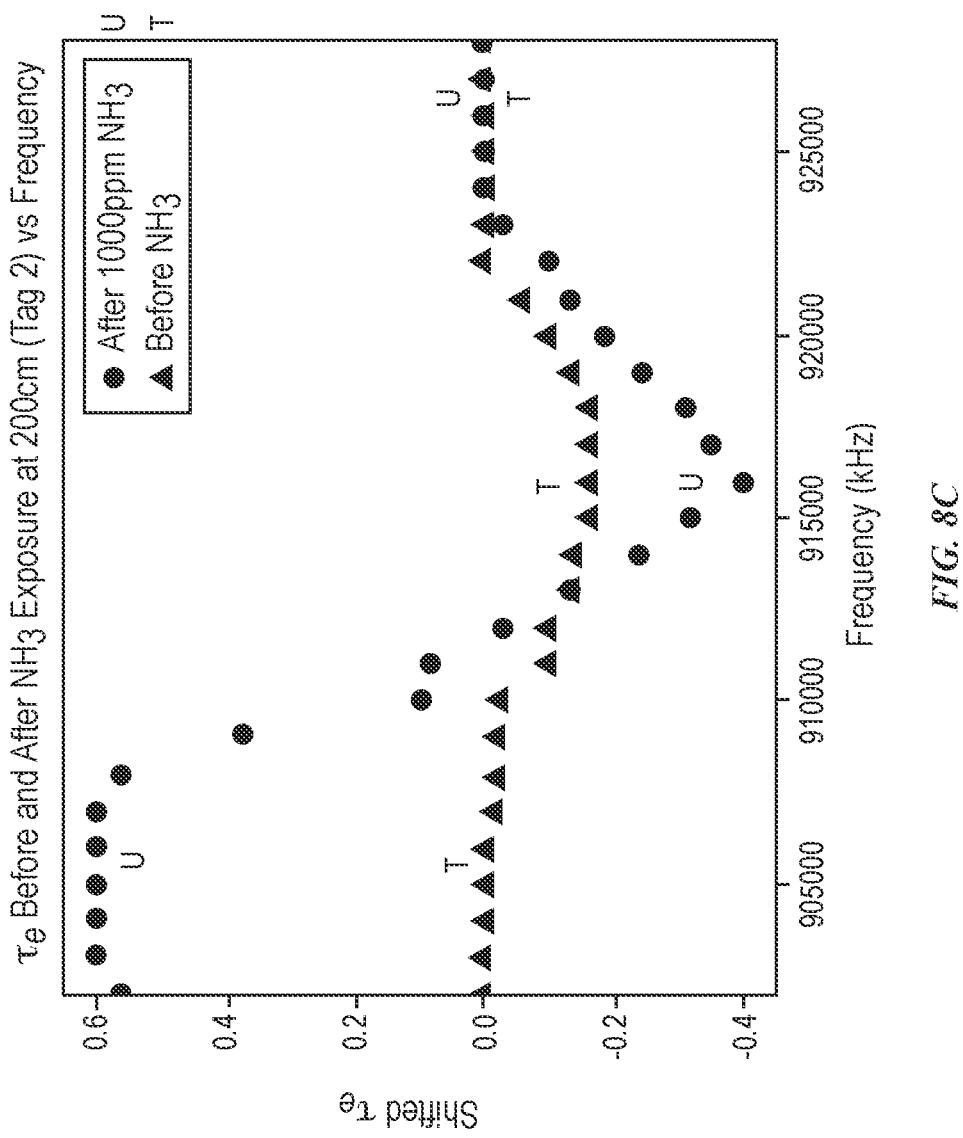
FIG. 8C is a graph illustrating carbon nanotube RFID sensor and $\tau_e$ experimental results for the second tag after exposure to ammonia at 200 centimeters.

In one embodiment shown, the RFID sensor 110 can exhibit an irreversible change in response after exposure to 1000 ppm NH$_3$ for 15 minutes. Such concentrations of ammonia were chosen due to the expectation that the resistive change in CNT resistance can increase with increased exposure to ammonia, with this concentration being selected to maximize a change in resistance while still being considered a trace amount thereof. FIGS. 8A-8D illustrate CNT RFID sensor and the experimental results for tags after exposure to NH$_3$ at various distances. Specifically, FIGS. 8A and 8B illustrate the before ammonia exposure (curve T) and after ammonia exposure (U) at 100 centimeters versus frequency of a first tag and a second tag, respectively, and FIG. 8C illustrates the before and after ammonia exposure at 200 centimeters versus frequency of the second tag. As shown, the ammonia exposure increased the resistance of the resistive element, resulting in an increase in $\tau_e$ in the lower frequency range for distances of both 100 centimeters and 200 centimeters. In particular, near 902 MHZ, before exposure, $\tau_e$ can be around 0) to 0.1, while after exposure to NH$_3$, $\tau_e$ can shift up to around 0.6. While copper and other materials present in the tag 110 may react to ammonia, based on the agreement between the CNT RFID sensors and the SMD resistor RFID sensors, it is expected that the driving factor of the change in response is the CNT sensing element, and not the changing of the resistors. Moreover, the measurements in FIGS. 8A-8C suggest that the lower limit of gas detection may be below 1000 ppm.

The materials, techniques, and other disclosures provided in this section are provided to demonstrate viability of the present disclosure, and to provide one or more non-limiting exemplary ways by which the present disclosures can be implemented and/or tested. The use of any parameters, materials, values, etc. are not intended to be limiting. A person skilled in the art, in view of the present disclosures, will understand other materials, techniques, parameters, values, etc. that can be used without departing from the spirit of the present disclosure.

EXAMPLES

Figure 9A:
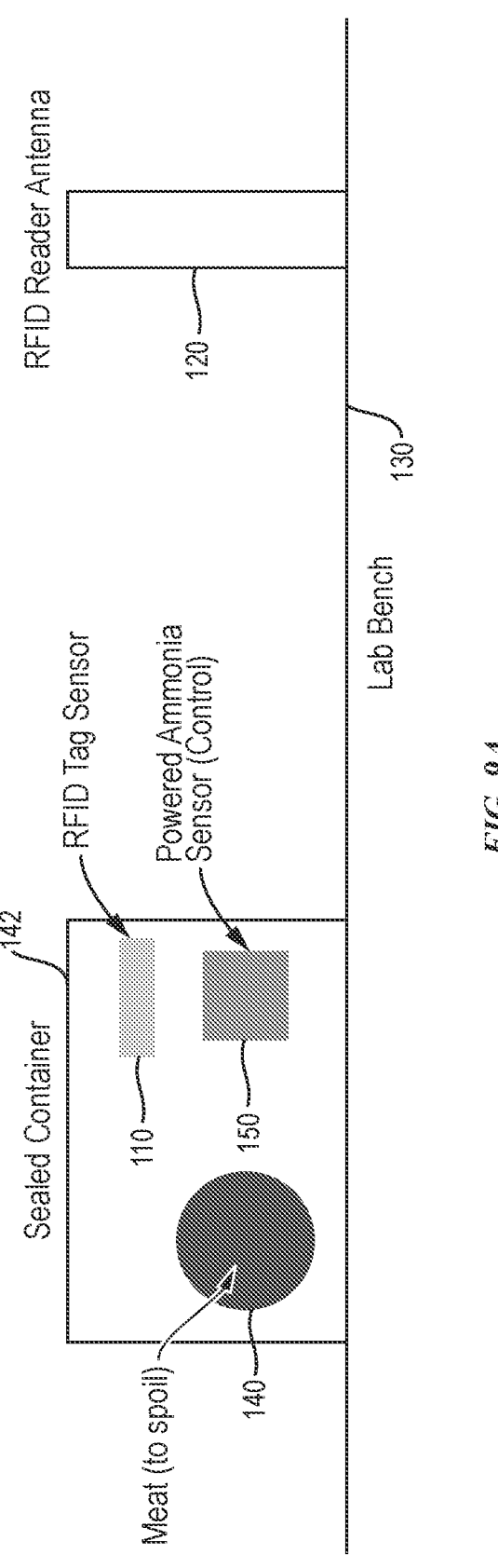
FIG. 9A is a schematic side view of an example experiment of the present embodiments for measuring food spoilage using an antenna spaced a distance apart from a container containing food.
Figure 9B:
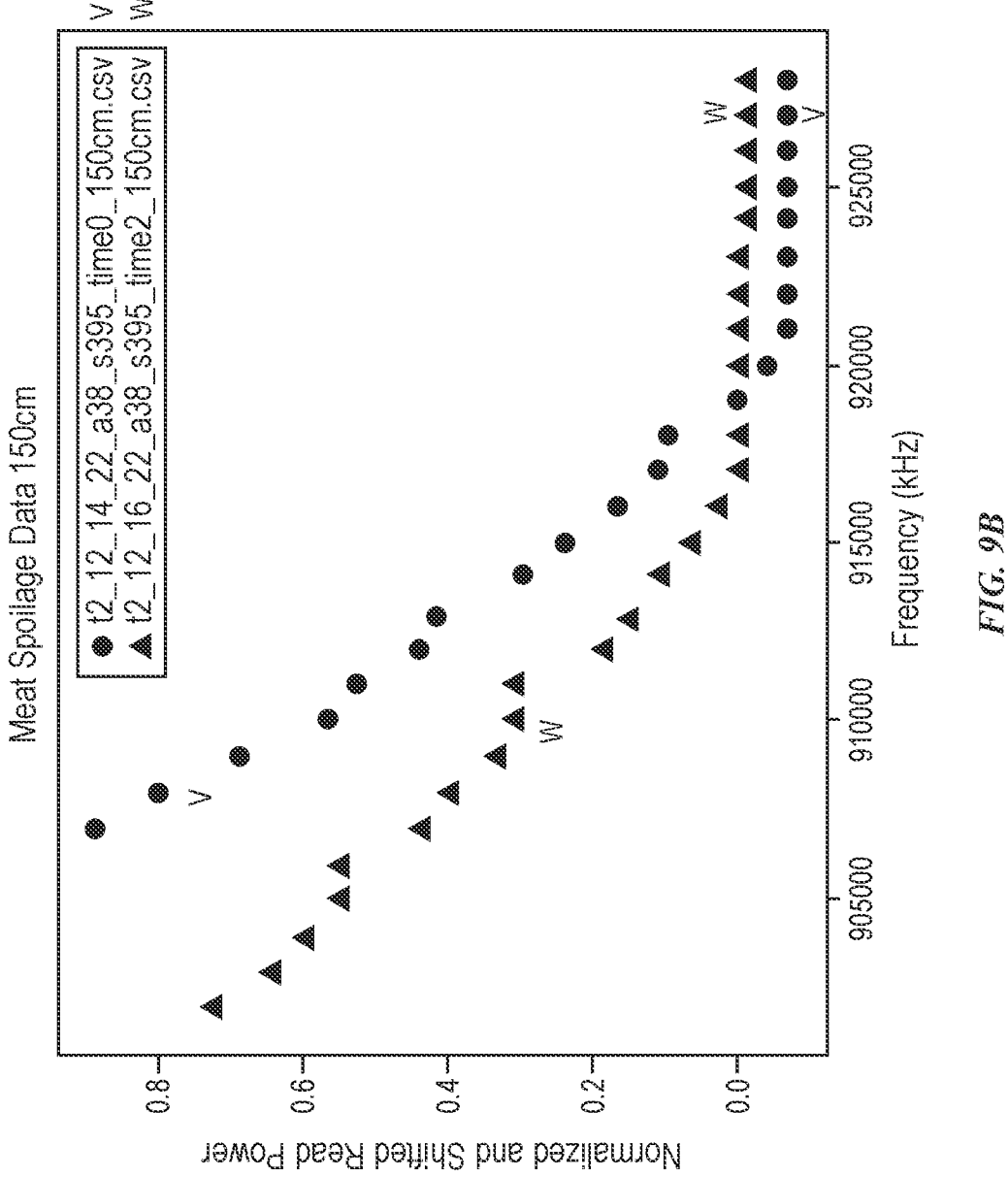
FIG. 9B is a graph illustrating spoilage data of the experiment of FIG. 9A at a distance of 150 centimeters between the container and the antenna over a forty-eight hour period.
Figure 9C:
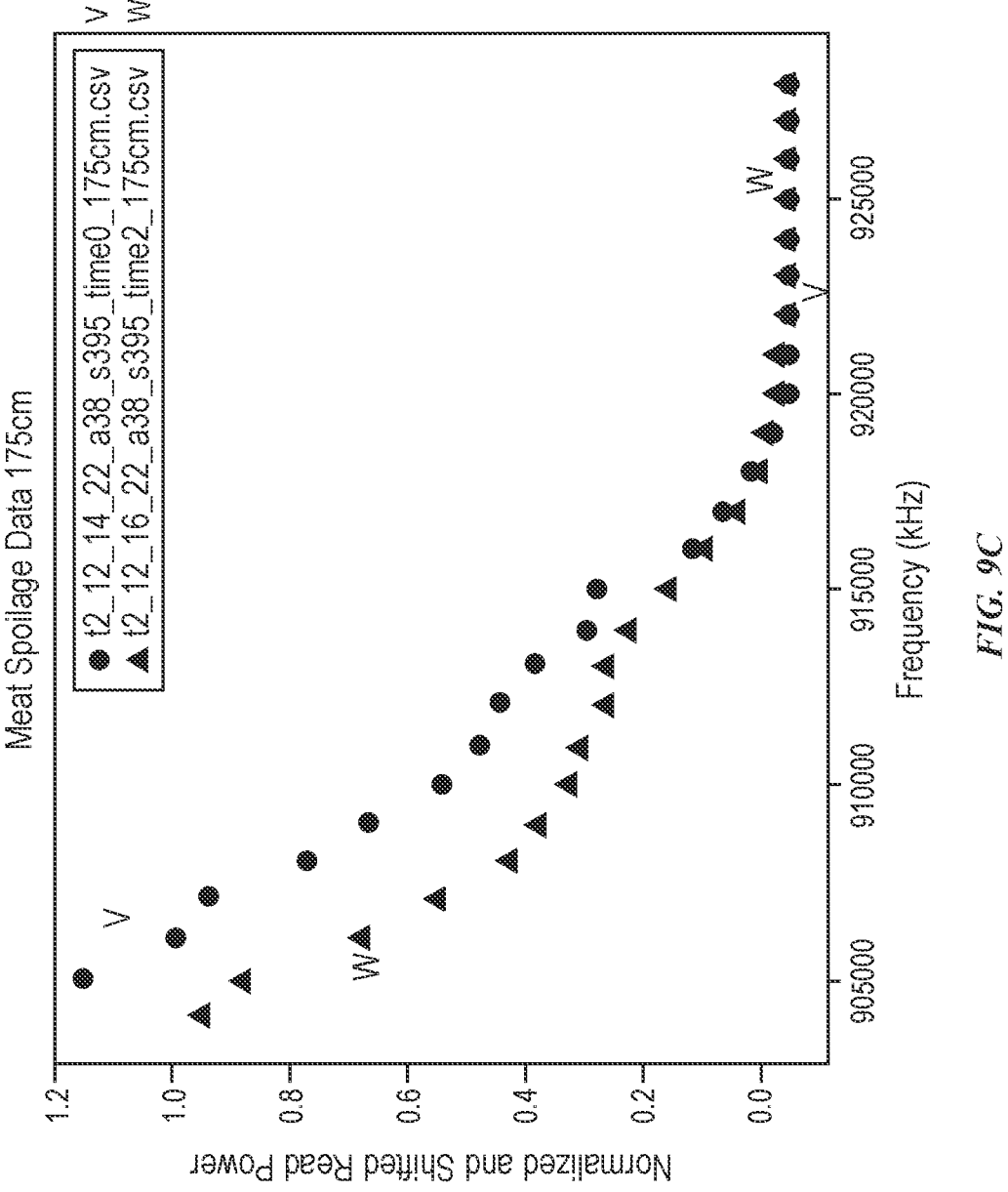
FIG. 9C is a graph illustrating spoilage data of the experiment of FIG. 9A at a distance of 175 centimeters between the container and the antenna over a forty-eight hour period.

As noted above, the tag 110 of the present embodiments can be used in warehouse and food delivery settings to track ambient gases that are indicative of food spoilage. For example, the tag 110 can be used to sense ammonia ($NH_3$) in the context of food spoilage. FIG. 9A illustrates an example experiment in which 60 grams of meat 140, e.g., ground beef, was placed in a container 142 along with an RFID sensor 110, e.g., a tag that performs sensing operations, and an MQ-137 Ammonia Gas sensor 150 as a control. The RFID sensor 110 can be interrogated at each of 150 cm and 175 cm at the start ($t_0$), and 48 hours later ($t_2$). FIGS. 9B-9C graphically illustrate the read power at each frequency for each of the 150 cm (curve V) and the 175 cm distances (curve W), respectively, normalized and shifted to align at the high end of the frequency band, while showing the changes in power at the low end of the frequency band. As shown, as the meat 140 spoiled, ammonia can be released into the container 142, which increases the resistance of the sensing element 106 and decreases the damping, with less power being needed to read the tag 110 at the low end of the frequency band. In some embodiments, the MQ-137 Ammonia Gas sensor 150 can be used to estimate the ammonia concentration in the container 142 as a function of time. For example, having previously calibrated the sensor with known concentrations of ammonia gas, the estimated ammonia concentration in the container 142 can be approximately 500 ppm.

A repetition of the experiment in which sampling occurred at the start to, at $t_1$=6 hours, and at 12=20 hours, also yielded accurate spoilage data, with spoilage occurring between 6 and 20 hours. The power used to read the tag 110 shifted again in the same manner as with respect to FIGS. 9B and 9C, suggesting that the RFID sensor can use the antenna 120 to operate independent of distance.

Examples of the above-described embodiments can include the following:

1. A method of detecting an analyte, comprising:
   capturing a presence of the analyte on one or more sensing elements disposed on, or coupled with, an antenna of an RFID sensor having one or more resonant peaks; and
   changing the frequency response of at least one peak of the one or more peaks,
   wherein the action of changing the frequency response occurs independent of a distance between the RFID sensor and a reader configured to detect the RFID sensor.

2. The method of claim 1, further comprising transducing the change in resistance of a sensing element of the one or more sensing elements to a frequency dependent change in the antenna frequency response without damping an entire frequency response of the antenna.

3. The method of claim 1 or 2, wherein the action of changing the response of one of the resonant peaks further comprises using one or more of the resonant peaks as a reference and another of the resonant peaks as a sensor reading.

4. The method of any of claims 1 to 3, wherein changing the frequency response of at least one peak further comprises shifting a resonant frequency of the tag.

5. The method of any of claims 1 to 4, wherein an operating distance of the tag is approximately in a range of zero meters to about four meters.

6. The method of any of claims 1 to 5, wherein the RFID sensor further comprises a chipless RFID sensor.

7 The method of any of claims 1 to 6, wherein the sensing element comprises a material configured to change resistance in response to an environmental stimulus such as a presence of a chemical in gaseous or liquid contact with the sensing element.

8 The method of any of claims 1 to 7, wherein the RFID sensor operates in an ultrahigh frequency (UHF) band.

9 The method of any of claims 1 to 8, further comprising one or more reference elements disposed on or coupled with the antenna of the RFID sensor.

10. The method of any of claims 1 to 9, wherein the sensitive material further comprises a network of carbon nanotubes.

11. The method of any of claims 1 to 10, further comprising generating the one or more resonant peaks of the RFID sensor.

12. A radio frequency identification (RFID) tag, comprising:
   an antenna having at least one sensing element that at least one of splits or reduces a surface current on a dipole in response to changes in at least one of chemical factors or environmental factors; and
   an RFID integrated circuit (IC) that interfaces with an RFID reader and connects to the antenna,
   wherein the antenna is configured to:
      generate a plurality of resonant peaks:
      change one of the resonant peaks of the antenna, the RFID sensor being configured to operate in an ultrahigh frequency (UHF) band:
      capture a presence of an analyte on the sensor element of the first dipole arm; and
      sense a change in resistance of the sensing element through the frequency response of the tag.

13. The tag of claim 12, further comprising:
   an inductive loop;
   a second sensing element;
   a first set of dipole arms coupled to the sensing elements; and
   a second set of dipole arms configured to be used as a reference.

14. The tag of claim 13, wherein target frequencies of the two dipole arms are such that the plurality of resonant peaks are indistinguishable and blend into one resonant peak at a given quality factor.

15. The tag of any of claims 12 to 14, further comprising a strap that attaches the IC to the antenna.

16. The tag of any of claims 12 to 15, further comprising a substrate that supports the antenna.

17. The tag of any of claims 12 to 16, wherein the change of one of the resonant peaks is achieved by shifting the apparent resonant frequency of the RFID sensor.

18. The tag of any of claims 12 to 17, wherein the at least one sensing element has a substantially lower conductivity than an antenna material, the sensing element including a nominal resistance approximately in a range of about 0.1 k$\Omega$ to about 10 k$\Omega$, and having dimensions of approximately 1×1 mm.

19. The tag of any of claims 12 to 18, wherein the analyte comprises a level of $CO_2$, $NH_3$, $CH_4$, or $C_2H_4$.

20. The tag of any of claims 12 to 19, wherein the change in resistance is sensed independent of a distance between the RFID sensor and the RFID reader.

21. The tag of any of claims 12 to 20, wherein the antenna is sensitive to about <80% changes in the conductivity of the material.

22. The tag of any of claims 12 to 21, wherein a maximum operating distance is approximately in a range of about five meters to about ten meters.

One skilled in the art will appreciate further features and advantages of the disclosures based on the provided for descriptions and embodiments. Accordingly, the inventions are not to be limited by what has been particularly shown and described. All publications and references cited herein are expressly incorporated herein by reference in their entirety.

What is claimed is:

1. A method of detecting an analyte, comprising:
capturing a presence of the analyte on one or more sensing elements disposed on, or coupled with, an antenna of an RFID sensor having one or more resonant peaks; and
changing a frequency response of at least one peak of the one or more peaks,
wherein the action of changing the frequency response occurs independent of a distance between the RFID sensor and a reader configured to detect the RFID sensor.

2. The method of claim 1, further comprising transducing a change in resistance of a sensing element of the one or more sensing elements to a frequency dependent change in the antenna frequency response without damping an entire frequency response of the antenna.

3. The method of claim 1, wherein the action of changing the response of one of the resonant peaks further comprises using one or more of the resonant peaks as a reference and another of the resonant peaks as a sensor reading.

4. The method of claim 1, wherein changing the frequency response of at least one peak further comprises shifting a resonant frequency of a tag.

5. The method of claim 1, wherein an operating distance of a tag is in a range of zero meters to four meters.

6. The method of claim 1, wherein the RFID sensor further comprises a chipless RFID sensor.

7. The method of claim 1, wherein the sensing element comprises a material configured to change resistance in response to an environmental stimulus.

8. The method of claim 7, wherein the environmental stimulus comprises a presence of a chemical in gaseous or liquid contact with the sensing element.

9. The method of claim 1, wherein the RFID sensor operates in an ultrahigh frequency (UHF) band.

10. The method of claim 1, further comprising one or more reference elements disposed on or coupled with the antenna of the RFID sensor.

11. The method of claim 1, wherein the one or more sensing elements further comprises a network of carbon nanotubes.

12. A radio frequency identification (RFID) tag, comprising: an antenna having at least one sensing element that at least one of splits or reduces a surface current on a dipole in response to changes in at least one of chemical factors or environmental factors; and
an RFID integrated circuit (IC) that interfaces with an RFID reader and connects to the antenna,
wherein the antenna is configured to:
generate a plurality of resonant peaks;
change one of the resonant peaks of the antenna, the RFID reader being configured to operate in an ultrahigh frequency (UHF) band;
capture a presence of an analyte on the sensor element of the antenna;
and
sense a change in resistance of the sensing element through the frequency response of the tag.

13. The tag of claim 12, further comprising:
an inductive loop;
a second sensing element;
a first set of dipole arms coupled to the sensing elements; and
a second set of dipole arms configured to be used as a reference.

14. The tag of claim 13, wherein target frequencies of the two dipole arms are such that the plurality of resonant peaks are indistinguishable and blend into one resonant peak at a given quality factor.

15. The tag of claim 12, further comprising a strap that attaches the IC to the antenna.

16. The tag of claim 12, wherein the change of one of the resonant peaks is achieved by shifting an apparent resonant frequency of the RFID sensor.

17. The tag of claim 12, wherein the at least one sensing element has a lower conductivity than an antenna material, the sensing element including a nominal resistance in a range of 0.1 kΩ to about 10 kΩ, and having dimensions of 1×1 mm.

18. The tag of claim 12, wherein the analyte comprises a level of $CO_2$, $NH_3$, $CH_4$, or $C_2H_4$.

19. The tag of claim 12, wherein the change in resistance is sensed independent of a distance between the RFID sensor and the RFID reader.

20. The tag of claim 12, wherein the antenna is sensitive to about <80% changes in a conductivity of the antenna.

21. The tag of claim 12, wherein a maximum operating distance is in a range of about five meters to ten meters.

* * * * *